United States Patent
Boral et al.

(10) Patent No.: US 12,461,431 B2
(45) Date of Patent: Nov. 4, 2025

(54) SLIM POP-OUT TELE CAMERA LENSES

(71) Applicant: Corephotonics Ltd., Tel Aviv (IL)

(72) Inventors: Itamar Boral, Tel Aviv (IL); Ziv Shemesh, Tel Aviv (IL); Asaf Pellman, Tel Aviv (IL); Ephraim Goldenberg, Tel Aviv (IL)

(73) Assignee: Corephontonics Ltd., Tel Aviv (IL)

( * ) Notice: Subject to any disclaimer, the term of this patent is extended or adjusted under 35 U.S.C. 154(b) by 0 days.

(21) Appl. No.: 18/725,779

(22) PCT Filed: Jan. 6, 2023

(86) PCT No.: PCT/IB2023/050107
§ 371 (c)(1),
(2) Date: Jun. 30, 2024

(87) PCT Pub. No.: WO2023/148559
PCT Pub. Date: Aug. 10, 2023

(65) Prior Publication Data
US 2025/0110390 A1 Apr. 3, 2025

Related U.S. Application Data

(60) Provisional application No. 63/328,304, filed on Apr. 7, 2022, provisional application No. 63/305,455, filed on Feb. 1, 2022.

(51) Int. Cl.
*G03B 17/04* (2021.01)
*G02B 3/00* (2006.01)
(Continued)

(52) U.S. Cl.
CPC ........... *G03B 17/04* (2013.01); *G02B 3/0043* (2013.01); *G02B 9/64* (2013.01); *G02B 13/0045* (2013.01); *H04N 23/55* (2023.01)

(58) Field of Classification Search
USPC .......................................................... 396/55
See application file for complete search history.

(56) References Cited

U.S. PATENT DOCUMENTS 2,106,752 A 2/1938 Land
2,354,503 A 7/1944 Arthur
(Continued)

FOREIGN PATENT DOCUMENTS

CN 101634738 A 1/2010
CN 102147519 A 8/2011
(Continued)

OTHER PUBLICATIONS

ISR in related PCT application PCT/IB2023/050107, dated Apr. 25, 2023.
(Continued)

*Primary Examiner* — Walter L Lindsay, Jr.
*Assistant Examiner* — Warren K Fenwick
(74) *Attorney, Agent, or Firm* — Nathan & Associates; Menachem Nathan

(57) ABSTRACT

Lens systems for compact digital cameras having a pop-out state and a collapsed state, the lens systems comprising: an image sensor having a sensor diagonal SD, and a lens with N≥6 lens elements L1-LN arranged along a lens optical axis (OA) starting with L1 from an object side toward an image side, each lens element Li having a respective clear aperture diameter $DA_{Li}$ 1≤i≤N, and having in the pop-out state a field of view 35 deg<FOV<50 deg, a f number (f/#), a lens thickness $T_{Lens}$, a back focal length BFL, an effective focal length EFL, and a total track length TTL<20 mm, the lens having in the collapsed state a collapsed total track length c-TTL, wherein c-TTL=$T_{Lens}$+1 mm, wherein EFL≥10 mm, wherein f/#<2, and wherein a ratio c-TTL/EFL<0.8.

22 Claims, 12 Drawing Sheets

(51) Int. Cl.
  *G02B 9/64* (2006.01)
  *G02B 13/00* (2006.01)
  *H04N 23/55* (2023.01)

(56) References Cited

U.S. PATENT DOCUMENTS

| | | |
|---|---|---|
| 2,378,170 A | 6/1945 | Aklin |
| 2,441,093 A | 5/1948 | Aklin |
| 3,388,956 A | 6/1968 | Eggert et al. |
| 3,524,700 A | 8/1970 | Eggert et al. |
| 3,558,218 A | 1/1971 | Grey |
| 3,864,027 A | 2/1975 | Harada |
| 3,942,876 A | 3/1976 | Betensky |
| 4,134,645 A | 1/1979 | Sugiyama et al. |
| 4,338,001 A | 7/1982 | Matsui |
| 4,465,345 A | 8/1984 | Yazawa |
| 4,792,822 A | 12/1988 | Akiyama et al. |
| 5,000,551 A | 3/1991 | Shibayama |
| 5,327,291 A | 7/1994 | Baker et al. |
| 5,331,465 A | 7/1994 | Miyano |
| 5,969,869 A | 10/1999 | Hirai et al. |
| 6,014,266 A | 1/2000 | Obama et al. |
| 6,035,136 A | 3/2000 | Hayashi et al. |
| 6,147,702 A | 11/2000 | Smith |
| 6,169,636 B1 | 1/2001 | Kreitzer |
| 6,654,180 B2 | 11/2003 | Ori |
| 7,187,504 B2 | 3/2007 | Horiuchi |
| 7,206,136 B2 | 4/2007 | Labaziewicz et al. |
| 7,515,351 B2 | 4/2009 | Chen et al. |
| 7,564,635 B1 | 7/2009 | Tang |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Iyama |
| 7,738,186 B2 | 6/2010 | Chen et al. |
| 7,777,972 B1 | 8/2010 | Chen et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,869,142 B2 | 1/2011 | Chen et al. |
| 7,898,747 B2 | 3/2011 | Tang |
| 7,916,401 B2 | 3/2011 | Chen et al. |
| 7,918,398 B2 | 4/2011 | Li et al. |
| 7,957,075 B2 | 6/2011 | Tang |
| 7,957,076 B2 | 6/2011 | Tang |
| 7,957,079 B2 | 6/2011 | Tang |
| 7,961,406 B2 | 6/2011 | Tang et al. |
| 8,000,031 B1 | 8/2011 | Tsai |
| 8,004,777 B2 | 8/2011 | Sano et al. |
| 8,077,400 B2 | 12/2011 | Tang |
| 8,149,523 B2 | 4/2012 | Ozaki |
| 8,218,253 B2 | 7/2012 | Tang |
| 8,228,622 B2 | 7/2012 | Tang |
| 8,233,224 B2 | 7/2012 | Chen |
| 8,253,843 B2 | 8/2012 | Lin |
| 8,279,537 B2 | 10/2012 | Sato |
| 8,363,337 B2 | 1/2013 | Tang et al. |
| 8,395,851 B2 | 3/2013 | Tang et al. |
| 8,400,717 B2 | 3/2013 | Chen et al. |
| 8,451,549 B2 | 5/2013 | Yamanaka et al. |
| 8,503,107 B2 | 8/2013 | Chen et al. |
| 8,514,500 B2 * | 8/2013 | Tsai .................. G02B 13/0045 359/764 |
| 8,514,502 B2 | 8/2013 | Chen |
| 8,570,668 B2 | 10/2013 | Takakubo et al. |
| 8,718,458 B2 | 5/2014 | Okuda |
| 8,780,465 B2 | 7/2014 | Chae |
| 8,810,923 B2 | 8/2014 | Shinohara |
| 8,854,745 B1 | 10/2014 | Chen |
| 8,958,164 B2 | 2/2015 | Kwon et al. |
| 9,185,291 B1 | 11/2015 | Shabtay |
| 9,229,194 B2 | 1/2016 | Yoneyama et al. |
| 9,235,036 B2 | 1/2016 | Kato et al. |
| 9,279,957 B2 | 3/2016 | Kanda et al. |
| 9,438,792 B2 | 9/2016 | Nakada et al. |
| 9,488,802 B2 | 11/2016 | Chen et al. |
| 9,568,712 B2 | 2/2017 | Dror et al. |
| 9,678,310 B2 | 6/2017 | Iwasaki et al. |
| 9,817,213 B2 | 11/2017 | Mercado |
| 9,869,846 B1 | 1/2018 | Bone et al. |
| 11,930,263 B2 * | 3/2024 | Rudnick ............ G02B 15/1425 |
| 12,170,832 B2 * | 12/2024 | Rudnick .................. G02B 9/62 |
| 2002/0118471 A1 | 8/2002 | Imoto |
| 2003/0048542 A1 | 3/2003 | Enomoto |
| 2005/0041300 A1 | 2/2005 | Oshima et al. |
| 2005/0062346 A1 | 3/2005 | Sasaki |
| 2005/0128604 A1 | 6/2005 | Kuba |
| 2005/0141103 A1 | 6/2005 | Nishina |
| 2005/0168840 A1 | 8/2005 | Kobayashi et al. |
| 2005/0270667 A1 | 12/2005 | Gurevich et al. |
| 2006/0092524 A1 | 5/2006 | Konno |
| 2006/0238902 A1 | 10/2006 | Nakashima et al. |
| 2006/0275025 A1 | 12/2006 | Labaziewicz et al. |
| 2007/0114990 A1 | 5/2007 | Godkin |
| 2007/0229983 A1 | 10/2007 | Saori |
| 2007/0247726 A1 | 10/2007 | Sudoh |
| 2007/0253689 A1 | 11/2007 | Nagai et al. |
| 2008/0056698 A1 | 3/2008 | Lee et al. |
| 2008/0094730 A1 | 4/2008 | Toma et al. |
| 2008/0094738 A1 | 4/2008 | Lee |
| 2008/0273250 A1 | 11/2008 | Nishio |
| 2008/0291531 A1 | 11/2008 | Heimer |
| 2008/0304161 A1 | 12/2008 | Souma |
| 2009/0002839 A1 | 1/2009 | Sato |
| 2009/0067063 A1 | 3/2009 | Asami et al. |
| 2009/0122423 A1 | 5/2009 | Park et al. |
| 2009/0135245 A1 | 5/2009 | Luo et al. |
| 2009/0141365 A1 | 6/2009 | Jannard et al. |
| 2009/0147368 A1 | 6/2009 | Oh et al. |
| 2009/0225438 A1 | 9/2009 | Kubota |
| 2009/0279191 A1 | 11/2009 | Yu |
| 2009/0303620 A1 | 12/2009 | Abe et al. |
| 2010/0026878 A1 | 2/2010 | Seo |
| 2010/0033844 A1 | 2/2010 | Katano |
| 2010/0060995 A1 | 3/2010 | Yumiki et al. |
| 2010/0165476 A1 | 7/2010 | Eguchi |
| 2010/0214664 A1 | 8/2010 | Chia |
| 2010/0277813 A1 | 11/2010 | Ito |
| 2011/0001838 A1 | 1/2011 | Lee |
| 2011/0032409 A1 | 2/2011 | Rossi et al. |
| 2011/0080655 A1 | 4/2011 | Mori |
| 2011/0102667 A1 | 5/2011 | Chua et al. |
| 2011/0102911 A1 | 5/2011 | Iwasaki |
| 2011/0115965 A1 | 5/2011 | Engelhardt et al. |
| 2011/0149119 A1 | 6/2011 | Matsui |
| 2011/0157430 A1 | 6/2011 | Hosoya et al. |
| 2011/0188121 A1 | 8/2011 | Goring et al. |
| 2011/0249347 A1 | 10/2011 | Kubota |
| 2012/0062783 A1 | 3/2012 | Tang et al. |
| 2012/0069455 A1 | 3/2012 | Lin et al. |
| 2012/0092777 A1 | 4/2012 | Tochigi et al. |
| 2012/0105708 A1 | 5/2012 | Hagiwara |
| 2012/0147489 A1 | 6/2012 | Matsuoka |
| 2012/0154929 A1 | 6/2012 | Tsai et al. |
| 2012/0194923 A1 | 8/2012 | Um |
| 2012/0229920 A1 | 9/2012 | Otsu et al. |
| 2012/0262806 A1 | 10/2012 | Lin et al. |
| 2013/0002933 A1 | 1/2013 | Topliss et al. |
| 2013/0057971 A1 | 3/2013 | Zhao et al. |
| 2013/0088788 A1 | 4/2013 | You |
| 2013/0176479 A1 | 7/2013 | Wada |
| 2013/0208178 A1 | 8/2013 | Park |
| 2013/0271852 A1 | 10/2013 | Schuster |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0063616 A1 | 3/2014 | Okano et al. |
| 2014/0092487 A1 | 4/2014 | Chen et al. |
| 2014/0139719 A1 | 5/2014 | Fukaya et al. |
| 2014/0146216 A1 | 5/2014 | Okumura |
| 2014/0160581 A1 | 6/2014 | Cho et al. |

(56) References Cited

U.S. PATENT DOCUMENTS

| | | |
|---|---|---|
| 2014/0204480 A1 | 7/2014 | Jo et al. |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0029603 A1 | 1/2015 | Kubota et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0160438 A1 | 6/2015 | Okuda |
| 2015/0168667 A1 | 6/2015 | Kudoh |
| 2015/0177496 A1 | 6/2015 | Marks et al. |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0323757 A1 | 11/2015 | Bone |
| 2015/0373252 A1 | 12/2015 | Georgiev |
| 2015/0373263 A1 | 12/2015 | Georgiev et al. |
| 2016/0004047 A1 | 1/2016 | Iwasaki et al. |
| 2016/0007008 A1 | 1/2016 | Molgaard et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0187631 A1 | 6/2016 | Choi et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Kim et al. |
| 2016/0353008 A1 | 12/2016 | Osborne |
| 2017/0023778 A1 | 1/2017 | Inoue |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0276911 A1 | 9/2017 | Huang |
| 2017/0310952 A1 | 10/2017 | Adomat et al. |
| 2017/0329108 A1 | 11/2017 | Hashimoto et al. |
| 2017/0337703 A1 | 11/2017 | Wu et al. |
| 2018/0024319 A1 | 1/2018 | Lai et al. |
| 2018/0048825 A1 | 2/2018 | Wang |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0120674 A1 | 5/2018 | Avivi et al. |
| 2018/0149835 A1 | 5/2018 | Park |
| 2018/0196236 A1 | 7/2018 | Ohashi et al. |
| 2018/0196238 A1 | 7/2018 | Goldenberg et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0268226 A1 | 9/2018 | Shashua et al. |
| 2019/0025549 A1 | 1/2019 | Hsueh et al. |
| 2019/0025554 A1 | 1/2019 | Son |
| 2019/0049687 A1 | 2/2019 | Bachar et al. |
| 2019/0075284 A1 | 3/2019 | Ono |
| 2019/0086638 A1 | 3/2019 | Lee |
| 2019/0094500 A1 | 3/2019 | Tseng et al. |
| 2019/0107651 A1 | 4/2019 | Sade |
| 2019/0121216 A1 | 4/2019 | Shabtay et al. |
| 2019/0155002 A1 | 5/2019 | Shabtay et al. |
| 2019/0170965 A1 | 6/2019 | Shabtay |
| 2019/0187443 A1 | 6/2019 | Jia et al. |
| 2019/0187486 A1 | 6/2019 | Goldenberg et al. |
| 2019/0196148 A1 | 6/2019 | Yao et al. |
| 2019/0215440 A1 | 7/2019 | Rivard et al. |
| 2019/0222758 A1 | 7/2019 | Goldenberg et al. |
| 2019/0235202 A1 | 8/2019 | Smyth et al. |
| 2019/0353874 A1 | 11/2019 | Yeh et al. |
| 2020/0084358 A1 | 3/2020 | Nadamoto |
| 2020/0192069 A1 | 6/2020 | Makeev et al. |
| 2020/0221026 A1 | 7/2020 | Fridman et al. |
| 2020/0241233 A1 | 7/2020 | Shabtay et al. |
| 2020/0333691 A1 | 10/2020 | Shabtay et al. |
| 2020/0400926 A1 | 12/2020 | Bachar |
| 2021/0048628 A1 | 2/2021 | Shabtay et al. |
| 2021/0048649 A1 | 2/2021 | Goldenberg et al. |
| 2021/0165192 A1 | 6/2021 | Goldenberg et al. |
| 2021/0263276 A1 | 8/2021 | Huang et al. |
| 2021/0364746 A1 | 11/2021 | Chen |
| 2021/0377450 A1 | 12/2021 | Shabtay et al. |
| 2021/0396974 A1 | 12/2021 | Kuo |
| 2022/0004085 A1 | 1/2022 | Shabtay et al. |
| 2022/0046151 A1 | 2/2022 | Shabtay et al. |
| 2022/0066168 A1 | 3/2022 | Shi |
| 2022/0113511 A1 | 4/2022 | Chen |
| 2022/0206264 A1 | 6/2022 | Rudnick et al. |
| 2022/0232167 A1 | 7/2022 | Shabtay et al. |
| 2025/0047965 A1* | 2/2025 | Rudnick ............... H04N 23/57 |

FOREIGN PATENT DOCUMENTS

| | | |
|---|---|---|
| CN | 102193162 A | 9/2011 |
| CN | 102466865 A | 5/2012 |
| CN | 102466867 A | 5/2012 |
| CN | 102147519 B | 1/2013 |
| CN | 103576290 A | 2/2014 |
| CN | 103698876 A | 4/2014 |
| CN | 104297906 A | 1/2015 |
| CN | 104407432 A | 3/2015 |
| CN | 105467563 A | 4/2016 |
| CN | 105657290 A | 6/2016 |
| CN | 106680974 A | 5/2017 |
| CN | 104570280 B | 6/2017 |
| CN | 111781710 A | 10/2020 |
| CN | 214375510 U | 10/2021 |
| JP | S54157620 A | 12/1979 |
| JP | S59121015 A | 7/1984 |
| JP | 6165212 A | 4/1986 |
| JP | S6370211 A | 3/1988 |
| JP | H0233117 A | 2/1990 |
| JP | 406059195 A | 3/1994 |
| JP | H07325246 A | 12/1995 |
| JP | H07333505 A | 12/1995 |
| JP | H09211326 A | 8/1997 |
| JP | H11223771 A | 8/1999 |
| JP | 2000131610 A | 5/2000 |
| JP | 2000292848 A | 10/2000 |
| JP | 3210242 B2 | 9/2001 |
| JP | 2004334185 A | 11/2004 |
| JP | 2006195139 A | 7/2006 |
| JP | 2007133096 A | 5/2007 |
| JP | 2007164065 A | 6/2007 |
| JP | 2007219199 A | 8/2007 |
| JP | 2007306282 A | 11/2007 |
| JP | 2008111876 A | 5/2008 |
| JP | 2008191423 A | 8/2008 |
| JP | 2010032936 A | 2/2010 |
| JP | 2010164841 A | 7/2010 |
| JP | 2011145315 A | 7/2011 |
| JP | 2011151448 A | 8/2011 |
| JP | 2012203234 A | 10/2012 |
| JP | 2012230323 A | 11/2012 |
| JP | 2013003317 A | 1/2013 |
| JP | 2013003754 A | 1/2013 |
| JP | 2013101213 A | 5/2013 |
| JP | 2013105049 A | 5/2013 |
| JP | 2013106289 A | 5/2013 |
| JP | 2013148823 A | 8/2013 |
| JP | 2014142542 A | 8/2014 |
| JP | 2017116679 A | 6/2017 |

(56) References Cited

FOREIGN PATENT DOCUMENTS

| | | | |
|---|---|---|---|
| JP | 2018059969 A | 4/2018 | |
| JP | 2019113878 A | 7/2019 | |
| KR | 20080088477 A | 10/2008 | |
| KR | 20090019525 A | 2/2009 | |
| KR | 20090131805 A | 12/2009 | |
| KR | 20110058094 A | 6/2011 | |
| KR | 20110071807 A | 6/2011 | |
| KR | 20110115391 A | 10/2011 | |
| KR | 20120068177 A | 6/2012 | |
| KR | 20140135909 A | 5/2013 | |
| KR | 20140023552 A | 2/2014 | |
| KR | 20160000759 A | 1/2016 | |
| KR | 101632168 B1 | 6/2016 | |
| KR | 20160115359 A | 10/2016 | |
| TW | M602642 U | 10/2020 | |
| TW | 202206874 A | 2/2022 | |
| WO | 2013058111 A1 | 4/2013 | |
| WO | 2013063097 A1 | 5/2013 | |
| WO | 2018130898 A1 | 7/2018 | |

OTHER PUBLICATIONS

WO in related PCT application PCT/IB2023/050107, dated Apr. 25, 2023.

Supplemental ISR in related PCT application PCT/IB2023/050107, dated Apr. 30, 2024.

A compact and cost effective design for cell phone zoom lens, Chang et al., Sep. 2007, 8 pages.

Consumer Electronic Optics: How small a lens can be? The case of panomorph lenses, Thibault et al., Sep. 2014, 7 pages.

Optical design of camera optics for mobile phones, Steinich et al., 2012, pp. 51-58 (8 pages).

The Optics of Miniature Digital Camera Modules, Bareau et al., 2006, 11 pages.

Modeling and measuring liquid crystal tunable lenses, Peter P. Clark, 2014, 7 pages.

Mobile Platform Optical Design, Peter P. Clark, 2014, 7 pages.

Boye et al., "Ultrathin Optics for Low-Profile Innocuous Imager", Sandia Report, 2009, pp. 56-56.

"Cheat sheet: how to understand f-stops", Internet article, Digital Camera World, 2017.

\* cited by examiner

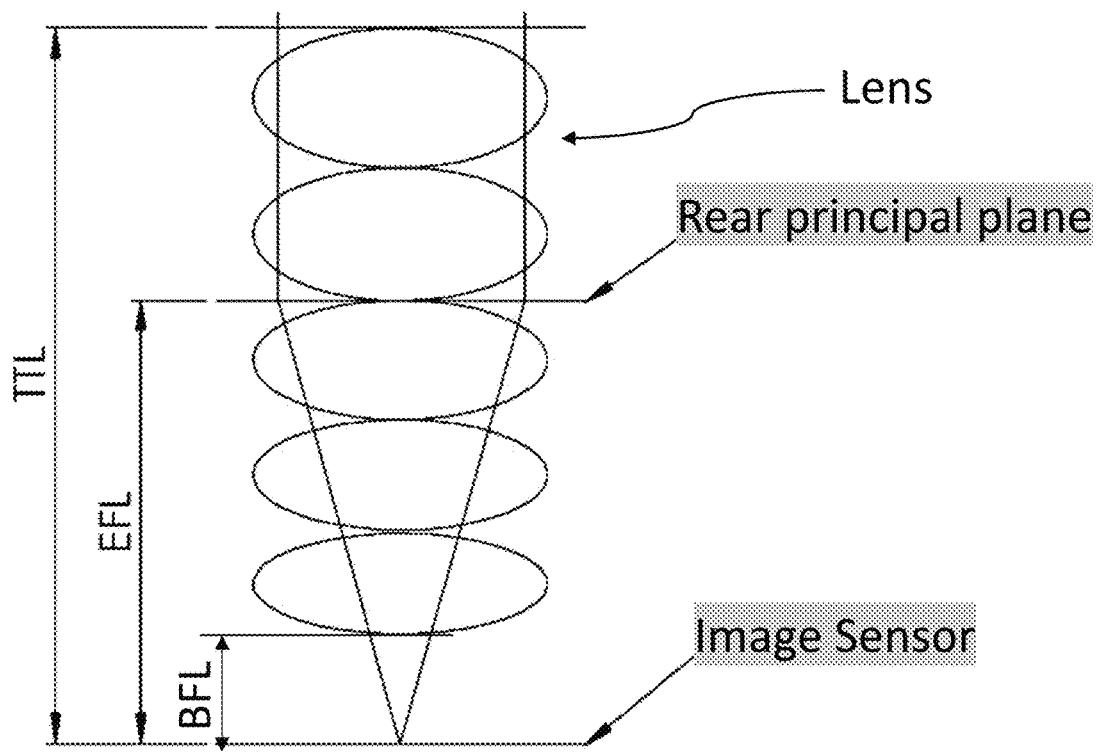
FIG. 1A　　　　　　　　KNOWN ART

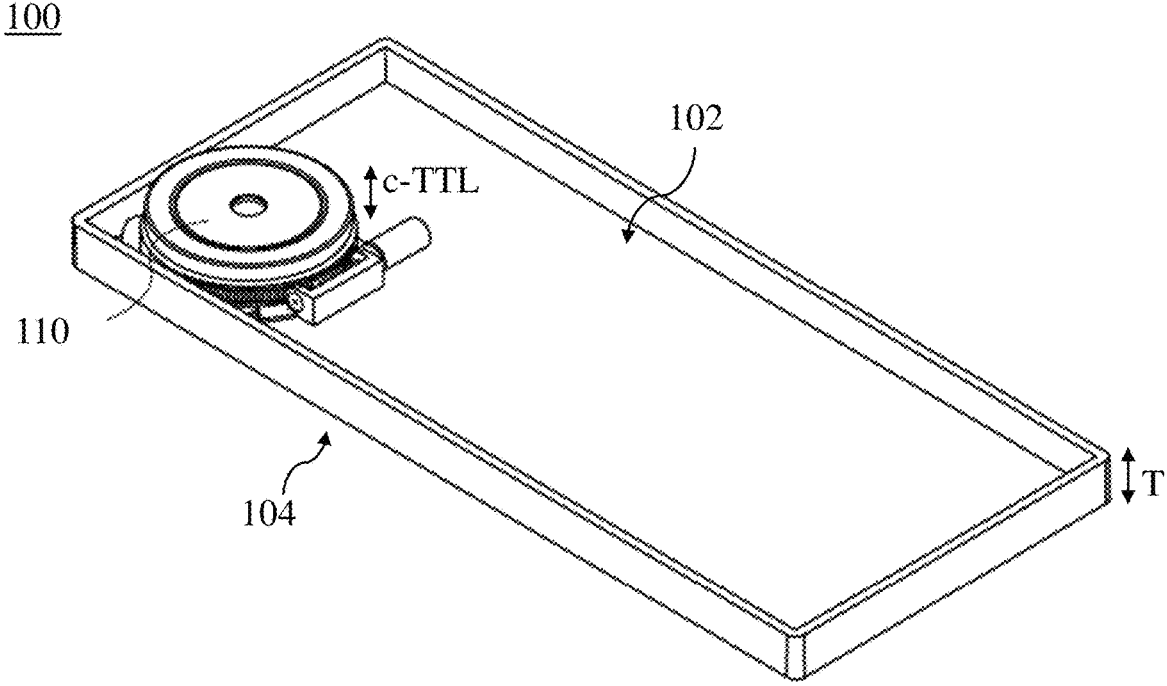
FIG. 1B      KNOWN ART
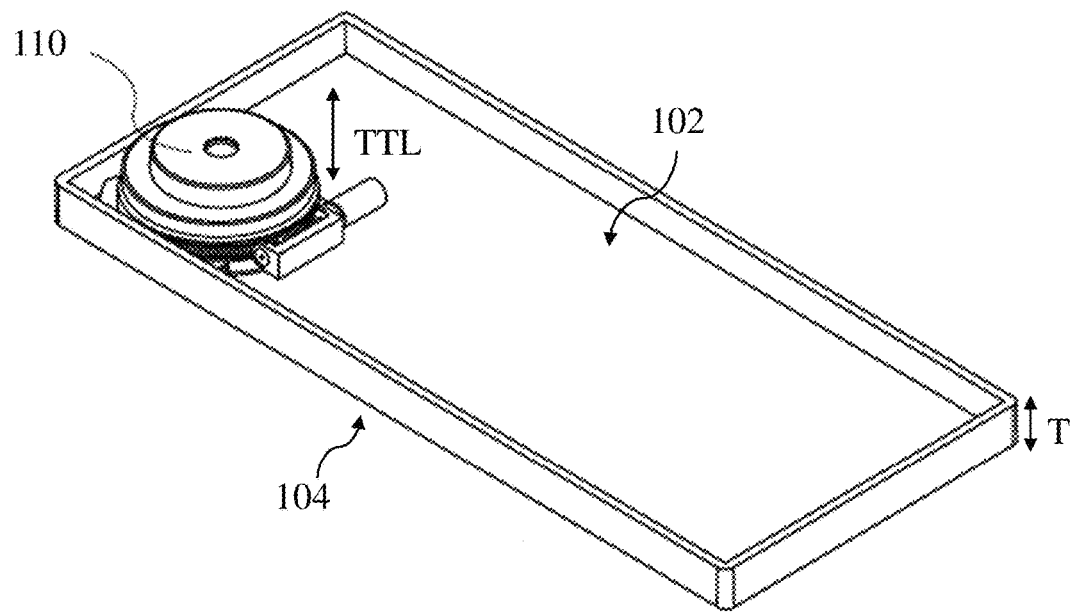
FIG. 1C      KNOWN ART

1100

SLIM POP-OUT TELE CAMERA LENSES

CROSS REFERENCE TO RELATED APPLICATIONS

This is a 371 application from international patent application PCT/IB2023/050107 filed Jan. 6, 2023, which is related to and claims priority from U.S. Provisional Patent Applications No. 63/305,455 filed Feb. 1, 2022 and 63/328,304 filed Apr. 7, 2022, which are incorporated herein by reference in their entirety.

FIELD

The present disclosure relates in general to digital cameras, and more particularly to digital cameras with pop-out mechanisms and lenses.

Definitions

In this application and for optical and other properties mentioned throughout the description and figures, the following symbols and abbreviations are used, all for terms known in the art.

Total track length (TTL): the maximal distance, measured along an axis parallel to the optical axis of a lens, between a point of the front surface S1 of a first lens element L1 and an image sensor, when the system is focused to an infinity object distance.

Back focal length (BFL): the minimal distance, measured along an axis parallel to the optical axis of a lens, between a point of the rear surface S2N of the last lens element LN and an image sensor, when the system is focused to an infinity object distance.

Effective focal length (EFL): in a lens (assembly of lens elements L1 to LN), the distance between a rear principal point P' and a rear focal point F' of the lens.

f-number (f/#): the ratio of an EFL and an aperture diameter ("DA") of a lens: f/#=EFL/DA.

Focal lengths fi of individual lens elements: focal lengths of individual lens elements are marked by the element number, i.e. the focal length of L1 is marked $f_1$, the focal length of L2 is marked $f_2$, etc.

BACKGROUND

Digital multi-cameras are standard in today's mobile electronic devices (or "mobile devices", e.g. smartphones, tablets, etc.). They include two or more cameras having lenses with different effective focal lengths (EFLs) that capture images of a same scene with different fields of view (FOVs). For example, a multi-camera may include a Wide camera having a Wide camera FOV ("$FOV_W$") of e.g. 65-95 degrees and a Tele (or "zoom") camera having a narrower FOV ("$FOV_T$") of e.g. 15-60 degrees and with spatial resolution (or pixel resolution) higher than that of the Wide camera. A spatial resolution of a Tele camera may be for example 1.5-10 times higher than a spatial resolution of a Wide camera, what is referred to as a zoom factor ("ZF") of 1.5-10.

A main challenge is to design Tele cameras that have (1) high ZFs of e.g. ZF>1.5× zoom, (2) a low f/# and (3) a low camera module height to fit into slim mobile devices with device heights of e.g. <15 mm. The camera module height is mainly determined by the total track length (TTL) of the camera lens. FIG. 1A illustrates schematically the definition of various lens entities such as TTL, effective focal length (EFL) and back focal length (BFL).

A camera's zoom relates to a "magnification" M of an object's image at the image sensor plane, given by Equation 1:

$$M = \frac{v}{u} \quad (1)$$

with u being the object-lens distance and v the lens-sensor distance. By approximating the thin lens equation (Equation 2):

$$\frac{1}{EFL} = \frac{1}{u} + \frac{1}{v} \quad (2)$$

for a typical zoom case (u>>EFL), and by using Equation 1, one obtains the zoom approximation, stating that the zoom is proportional to EFL, M~EFL (Equation 3):

$$M \approx \frac{EFL}{u} \quad (3)$$

For a camera with a large ZF, a large EFL with large corresponding TTL is required.

Pop-out cameras combine the advantages of a large TTL for large zoom when the camera is in use ("pop-out state"), and a slim design by collapsing the TTL to a collapsed TTL ("c-TTL") when the camera is not in use ("collapsed state"). Pop-out cameras are described for example in co-owned international patent applications PCT/IB2020/058697. FIG. 1B illustrates schematically a mobile device 100 including a known pop-out camera 110 in the collapsed state. The c-TTL is compatible with a height (or thickness) of modern mobile devices, i.e. in the collapsed state, pop-out camera 110 does not exceed a height of mobile device 100. FIG. 1C illustrates schematically mobile device 100 including pop-out camera 110 in the pop-out state, i.e. when the pop-out camera is active. In the pop-out state, pop-out camera 110 has a second TTL ("TTL"), so that pop-out camera 110 exceeds a height of mobile device 100, i.e. pop-out camera 110 protrudes (or "pops out") from mobile device 100. Typically, a mobile device has a thickness ("T") of about T=5 mm-15 mm. A pop-out camera may protrude from (i.e. exceed the T of the) mobile device 100 by about 1 mm-10 mm. Mobile device 100 has a back (or "rear") surface 102 that includes pop-out camera 110. Mobile device 100 has a front surface 104 which is oriented parallel to back surface 102 and points to (or is "oriented towards") a direction opposite of a direction in which back surface 102 points. Front surface 104 may for example include a screen (not shown). It would be beneficial to have Tele lens designs that support pop-out Tele cameras having large EFLs of EFL≥10 mm for high ZF, low f numbers of f/#<2 and a c-TTL/EFL ratio that fulfils c-TTL/EFL<0.8 for low camera module height.

SUMMARY

In various exemplary embodiments, there are provided lens systems for compact digital cameras having a pop-out state and a collapsed state, the lens systems comprising: an image sensor having a sensor diagonal SD, and a lens with N≥6 lens elements L1-LN arranged along a lens optical axis (OA) starting with L1 from an object side toward an image side, each lens element Li having a respective clear aperture diameter $DA_{Li}$, $1 \leq i \leq N$, and having in the pop-out state a field of view 35 deg<FOV<50 deg, a f number (f/#), a lens thickness $T_{Lens}$, a back focal length BFL, an effective focal length EFL, and a total track length TTL<20 mm, the lens having in the collapsed state a collapsed total track length c-TTL, wherein c-TTL=$T_{Lens}$+1 mm, wherein EFL≥10 mm, wherein f/#<2, and wherein a ratio c-TTL/EFL<0.8.

In some examples, a lens system is configured to switch from the pop-out state to the collapsed state and vice versa by collapsing BFL to a collapsed BFL (c-BFL).

In some examples, c-TTL/EFL<0.75. In some examples, c-TTL/EFL<0.7.

In some examples, 0.9×EFL<TTL<1.1×EFL.

In some examples, 8 mm<SD<15 mm.

In some examples, EFL≥12 mm. In some examples, EFL≤20 mm.

In some examples, TTL<15 mm.

In some examples, f/#<1.9. In some examples, f/#<1.8. In some examples, f/#<1.7. In some examples, $T_{Lens}$/TTL<0.75. In some examples, $T_{Lens}$/TTL<0.7.

In some examples, BFL>0.3×TTL.

In some examples, 0.04≤c-BFL/BFL<0.9.

In some examples, $DA_{L1}/DA_{L4}$>1.15 and $DA_{LN}/DA_{L4}$>1.15. In some examples, $DA_{L1}/DA_{L4}$>1.25 and $DA_{LN}/DA_{L4}$>1.25. In some examples, $DA_{L1}/DA_{L5}$>1.25 and $DA_{LN}/DA_{L5}$>1.25. In some examples, $DA_{L1}/DA_{L4}$>1.35 and $DA_{LN}/DA_{L4}$>1.35. In some examples, 0.9<$DA_{L1}/DA_{LN}$<1.15.

In some examples, the lens has a 35 mm equivalent focal length (35 mm EqFL) and 35 deg<35 mm EqFL<70 deg. In some examples, 40 deg<35 mm EqFL<55 deg.

In some examples, lens elements L1, L2, L3 and L4 have respective air gaps therebetween with respective widths d12, d23 and d34 along the OA, and each of d12, d23 and d34 is smaller than 0.5 mm. In some examples, respective ratios between each of d12, d23 and d34 and the TTL, d12/TTL, d23/TTL and d34/TTL, are smaller than 5%.

In some examples, a thickness of L2 along the OA is larger by more than 80% than a thickness along the OA of any other lens element in the lens.

In some examples, a magnitude of a lens power of L1 is lower than a magnitude of a lens power of any other lens element.

In some examples, an air gap d34 along the OA between L3 and L4 and an air gap d45 along the OA between L4 and L5 are larger by >60% than any other air gap between lens elements.

In some examples, L1 and L2 form a doublet lens. In some examples, L2 and L3 form a doublet lens. In some examples, L4 and L5 form a doublet lens. In some examples, L6 and L7 form a doublet lens.

In some examples, both L1 and L2 have respective thicknesses T1 and T2 along the OA greater than 1 mm, have respective refractive indices n1 and n2 smaller than 1.55, have respective Abbe numbers v1 and v2 greater than 50, and have each a positive lens power.

In some examples, the ratio of a thickness T2 of L2 along the OA and $T_{Lens}$ fulfils $T2/T_{Lens}$>0.3.

In some examples, pairs of lens elements L1 and L2, L3 and L4, and L6 and L7 form respective doublet lenses.

In some examples, L1 is made of glass and has an Abbe number larger than 50.

In some examples, N=7 and lens elements L1-L7 have a power sequence plus-minus-plus-minus-plus-minus-minus.

In some examples, a rear surface of L1 that faces the image side has a deflection point that is not located at the OA.

In some examples, L2 has a focal length $f_2$, and a magnitude $|f_2|$ fulfils $|f_2|$/EFL<1.

In some examples, L1 has a focal length $f_1$, and a magnitude $|f_1|$ fulfils $|f_1|$/EFL<0.5. In some examples, f/#≤1.9.

In some examples, N=7, and lens elements L1-L7 have a power sequence plus-minus-minus-plus-plus-minus-minus.

In some examples, an air gap d67 between L6 and L7 along the OA fulfils $d67/T_{Lens}$>0.125.

In some examples, L1 has a focal length $f_1$, and a magnitude $|f_1|$ fulfils $|f_1|$/EFL<0.75.

In some examples, N=6, and lens elements L1-L6 have a power sequence plus-plus-minus-plus-minus-minus. In some such examples, a ratio of a thickness T2 of L2 along the OA and a thickness $T_i$ (i=1, 3, . . . , N) of any other lens element $T2/T_i$>1.85. In some such examples, the ratio of a thickness T2 of L2 along the OA and $T_{Lens}$ fulfils $T2/T_{Lens}$>0.15. In some such examples, a magnitude of a lens power of L1 is lower than a magnitude of any lens power of any other lens element. In some such examples, L2 and L3 form a doublet lens. In some such examples, $|f_2|$/EFL<0.75. In some such examples, L3 has a focal length $f_3$, and a magnitude $|f_3|$ fulfils $|f_3|$/EFL<1. In some such examples, L1 has a focal length $f_1$, and a magnitude $|f_1|$ fulfils $|f_1|$/EFL>10. In some such examples, L2 is made of glass and has an Abbe number larger than 50.

In some examples, N=7, and lens elements L1-L7 have a power sequence of plus-plus-minus-plus-minus-plus-minus. In some such examples, L6 and L7 forms an inverted doublet lens. In some such examples, both L1 and L2 have respective thicknesses T1, T2>1 mm along the OA, respective refractive indices n1, n2<1.55, respective Abbe numbers v1, v2>50 and positive lens powers. In some such examples, a rear surface of L2 that faces the image side has a deflection point that is not located at the OA. In some such examples, L7 has a focal length $f_7$, and a magnitude $|f_7|$ fulfils $|f_7|$/EFL<0.75. In some such examples, f/#≤1.8.

In some examples, the ratio of T2 and the lens thickness fulfils $T2/T_{Lens}$>0.2 or $T2/T_{Lens}$>0.2. In some such examples, a rear surface of L2 has a deflection point which is not located at the OA. In some such examples, f/#≤1.9. In some such examples, pairs of lens elements L1 and L2, L3 and L4, and L6 and L7 form respective inverted doublet lenses. In some such examples, $|f_1|$/EFL>50. In some such examples, L6 has a focal length $f_6$, and a magnitude $|f_6|$ fulfils $|f_6|$/EFL<1. In some such examples, L7 has a focal length $f_7$, and a magnitude $|f_7|$ fulfils $|f_7|$/EFL<1.

In some examples, d12/TTL and d34/TTL, are smaller than 2.5%. In some such examples, lens element pair L6, L7 forms an inverted doublet lens. In some such examples, L4 has a focal length $f_4$, and a magnitude $|f_4|$ fulfils $|f_4|$/EFL<1. In some such examples, $|f_6|$/EFL<1. In some such examples, $|f_7|$/EFL<1. In some such examples, f/#≤1.9.

In some examples, N=7, and lens elements L1-L7 have a power sequence of minus-plus-minus-plus-minus-plus-minus. In some such examples, pairs of lens elements L1 and L2, L3 and L4, and L6 and L7 form respective inverted doublet lenses. In some such examples, each of $|f_1|$-$|f_7|$ fulfils $|f_1|$/EFL-$|f_7|$/EFL>1. In some such examples, f/#≤1.9.

In some examples, N=7, and lens elements L1-L7 have a power sequence of plus-minus-plus-plus-minus-minus-minus. In some such examples, f/#≤1.8, f/#≤1.7, or f/#≤1.65. In some such examples, L1 is the thickest lens element in the lens and has a thickness T1, L3 is the second thickest lens element in the lens and has a thickness T3, L6 is the third thickest lens element in the lens and has a thickness T6, and T1/T6>3 and T3/T6>3. In some such examples, $DA_{L1}/DA_{L5}$>1.75 and $DA_{L1}/DA_{LN}$<1.6. In some such examples, $DA_{L1}$≥7.5 mm. In some such examples, L2 and L3 form an inverted doublet lens, and L4 and L5 form a doublet lens. In some such examples, $|f_1|/EFL$<1. In some such examples, $|f_6|/EFL$>100. In some such examples, $|f_7|/EFL$>20.

In various exemplary embodiments, a lens system as above or below is integrated in a camera module, and the camera module is integrated in a smartphone. The smartphone has a back surface, and the OA of the pop-out lens is oriented perpendicular to the back surface of the smartphone.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. If identical elements are shown but numbered in only one figure, it is assumed that they have the same number in all figures in which they appear. The drawings and descriptions are meant to illuminate and clarify Examples disclosed herein and should not be considered limiting in any way. In the drawings:

FIG. 1A illustrates schematically the definition of various entities such as TTL and EFL;

FIG. 1B illustrates schematically a mobile device including a known pop-out camera in the collapsed state;

FIG. 1C illustrates schematically the mobile device of FIG. 1B with the pop-out camera in a pop-out state;

DETAILED DESCRIPTION

Figure 2A:
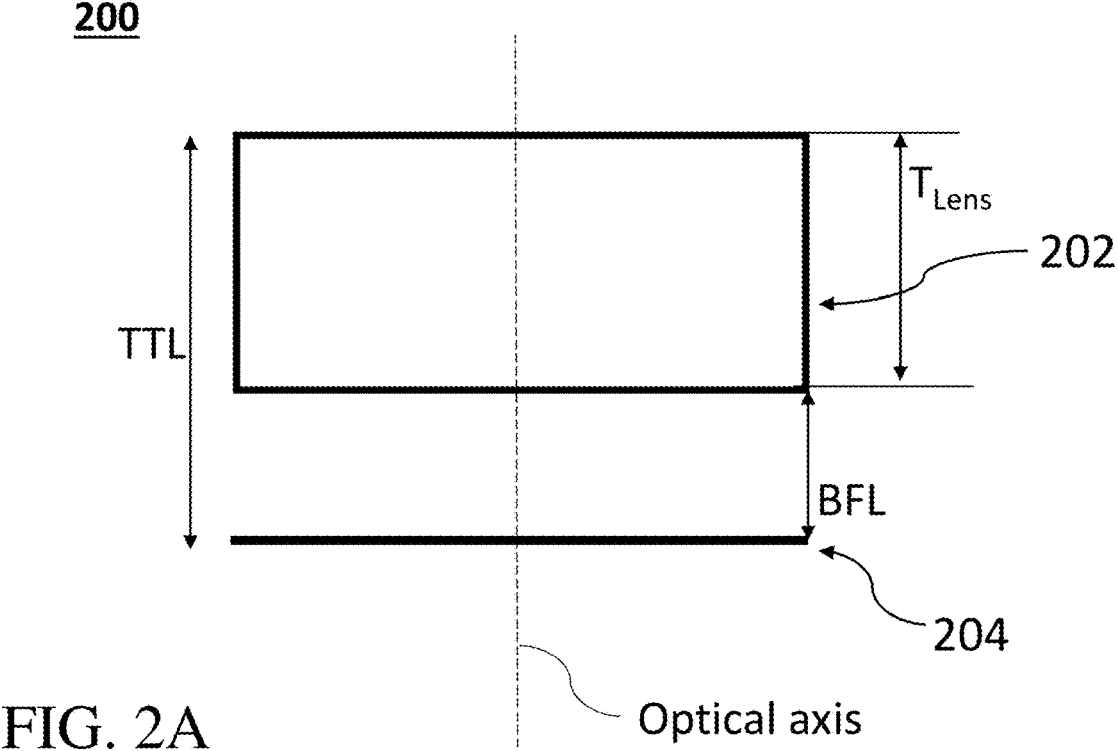
FIG. 2A shows schematically a pop-out optical lens system disclosed herein in a pop-out state.

FIG. 2A shows an example of a pop-out optical lens system 200 that comprises a pop-out lens 202 having a lens thickness $T_{Lens}$ and an image sensor 204 disclosed herein in a pop-out state. Pop-out lens 202 has a lens optical axis, as shown.

Figure 2B:
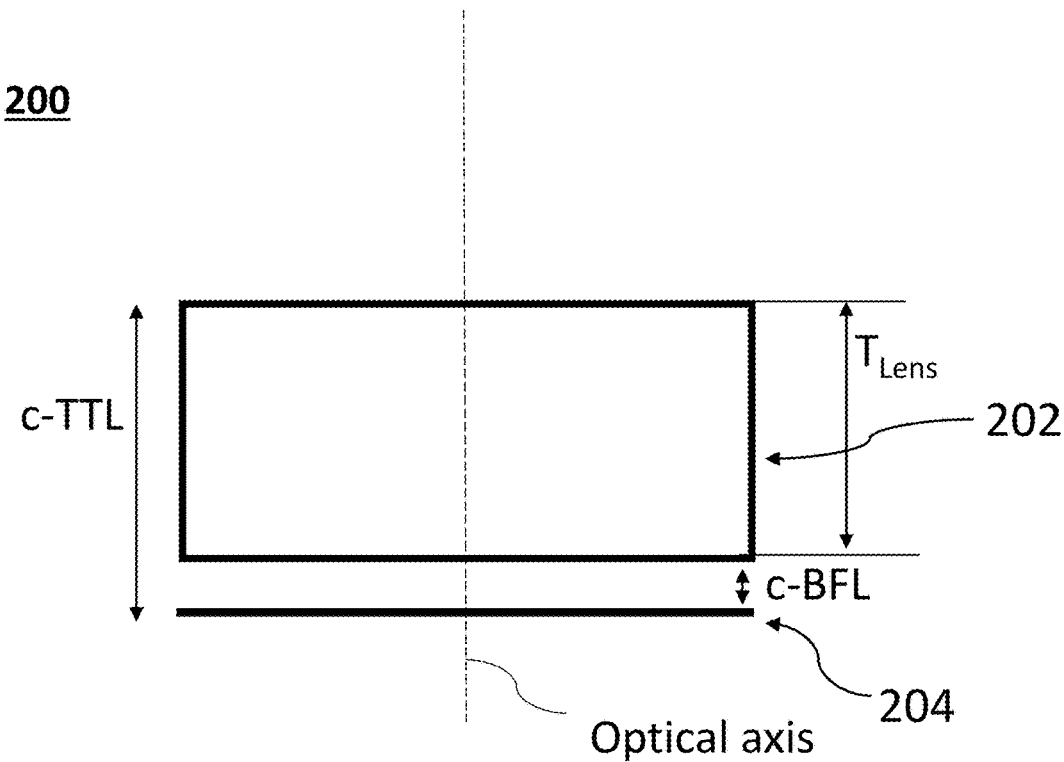
FIG. 2B shows schematically the pop-out system of FIG. 2A in a collapsed state.

FIG. 2B shows pop-out optical lens system 200 in a collapsed state. BFL is collapsed to a collapsed BFL (marked "c-BFL"), i.e. a distance between lens 202 and image sensor 204 is reduced, resulting in a collapsed TTL ("c-TTL"). A fundamental lower limit for c-TTL is given by the thickness of lens 202 ("$T_{Lens}$"), i.e. c-TTL>$T_{Lens}$. In fact, c-TTL=$T_{Lens}$+C-BFL, wherein, c-BFL=0.2 mm–1.5 mm or more. This means that c-TTL=$T_{Lens}$+0.2 mm–$T_{Lens}$+1.5 mm or more.

Pop-out optical lens system 200 is operational to be used in a pop-out camera. The resulting pop-out camera is operational as a camera only in the pop-out state. In the collapsed state, the pop-out camera is not operational as a camera, i.e. it is inactive.

Pop-out optical lens system 200 is a "1-group" (or "1G") pop-out optical lens system, i.e. lens 202 moves as one unit, meaning that distances between lens elements included in lens 202 do not change when switching from the pop-out state to the collapsed state, but only the BFL changes . . . .

For performing optical image stabilization (OIS) in a pop-out camera, the pop-out camera may use several methods known in the art. Such methods may be "lens shift OIS", wherein the lens is moved radially along two directions perpendicular to the lens optical axis and relative to the image sensor and a camera hosting device for OIS, or "sensor shift OIS", wherein the image sensor is moved along two directions which are perpendicular to the lens optical axis and perpendicular to each other relative to the lens and a camera hosting device for OIS.

All pop-out optical lens systems described herein may be focused by moving an entire lens such as lens 202 along the lens optical axis with respect to an image sensor or moving an image sensor with respect to a lens.

Lens 202 includes a plurality of N lens elements Li (wherein "i" is an integer between 1 and N and wherein N may be for example 6, 7 or more. L1 is the lens element closest to the object side and LN is the lens element closest to the image side, i.e. the side where the image sensor is located. This order holds for all lenses and lens elements disclosed herein. Each lens element Li comprises a respective front surface S2i-1 (the index "2i-1" being the number of the front surface) and a respective rear surface S2i (the index "2i" being the number of the rear surface). This numbering convention is used throughout the description. Alternatively, as done throughout this description, lens surfaces are marked as "Sk", with k running from 1 to 2N. The front surface and the rear surface may be in some cases aspherical. This is however not limiting. The thickness of an i-th lens element Li is indicated by $T_i$. As used herein the term "front surface" of each lens element refers to the surface of a lens element located closer to the entrance of the camera (camera object side) and the term "rear surface" refers to the surface of a lens element located closer to the image sensor (camera image side).

Assuming a first optical lens system including a lens with N lens elements, and a second optical lens system is desired which includes a lens with N+1 lens elements and which reproduces all optical properties of the first optical lens system, one may take a single particular lens element from the first optical lens system and design a sub-lens system including 2 lens elements that exactly reproduces the optical properties of the single particular lens element. All pop-out optical lens systems disclosed herein can be used in the pop-out camera examples described in the co-owned PCT patent application PCT/IB2020/058697.

All pop-out optical lens system disclosed herein are shown in the pop-out state. They are switched between the pop-out state and the collapsed state by collapsing BFL to c-BFL, as shown in FIGS. 2A-B. In the collapsed state, all pop-out optical lens systems disclosed herein have a c-BFL of 0.2 mm-4.5 mm. A small c-BFL and a small $T_{Lens}$ are beneficial for achieving a slim camera module that can be integrated in a slim mobile device such as a smartphone. To clarify, all lens systems disclosed herein may beneficially be included or incorporated in smartphones. An optical axis of a pop-out lens may be oriented perpendicular to a back surface of a smartphone including a pop-out camera (see e.g. FIGS. 1B and 1C). Examples of smartphones including pop-out cameras may be found in PCT/IB2020/058697.

Table 1 shows the values and ranges that are included in optical lens system examples 300-1100 disclosed herein (TTL, c-TTL, EFL, BFL, c-BFL, SD, $T_{Lens}$, DA given in mm; Half-field-of-view ("HFOV") and 35 mm equivalent focal length ("35 mm EqFL") are given in degrees, power sequence and #$DA_{MIN}$ are given without units).

c-$TTL_{MIN}$, c-$TTL_{MID}$ and c-$TTL_{MAX}$ and c-$BFL_{MIN}$, c-$BFL_{MID}$ and c-$BFL_{MAX}$ respectively refer to minimum, an intermediate and maximum c-TTLs and c-BFLs that can be achieved in the respective example. c-$BFL_{MID}$ and c-$TTL_{MID}$ refer to an intermediate c-BFL=1 mm.

"#$DA_{MIN}$" represents the number i of the lens element Li in a lens that has the smallest aperture diameter ("DAi"). "DAi" of a lens element is given by the larger value of the front or the rear surface.

In general, in Table 1, "MIN" and "MAX" refer respectively to minimum and maximum values in a range of values.

306 may be for example infra-red (IR) filter, and/or a glass image sensor dust cover. Pop-out lens 302 has a lens optical axis 308.

Figure 3:
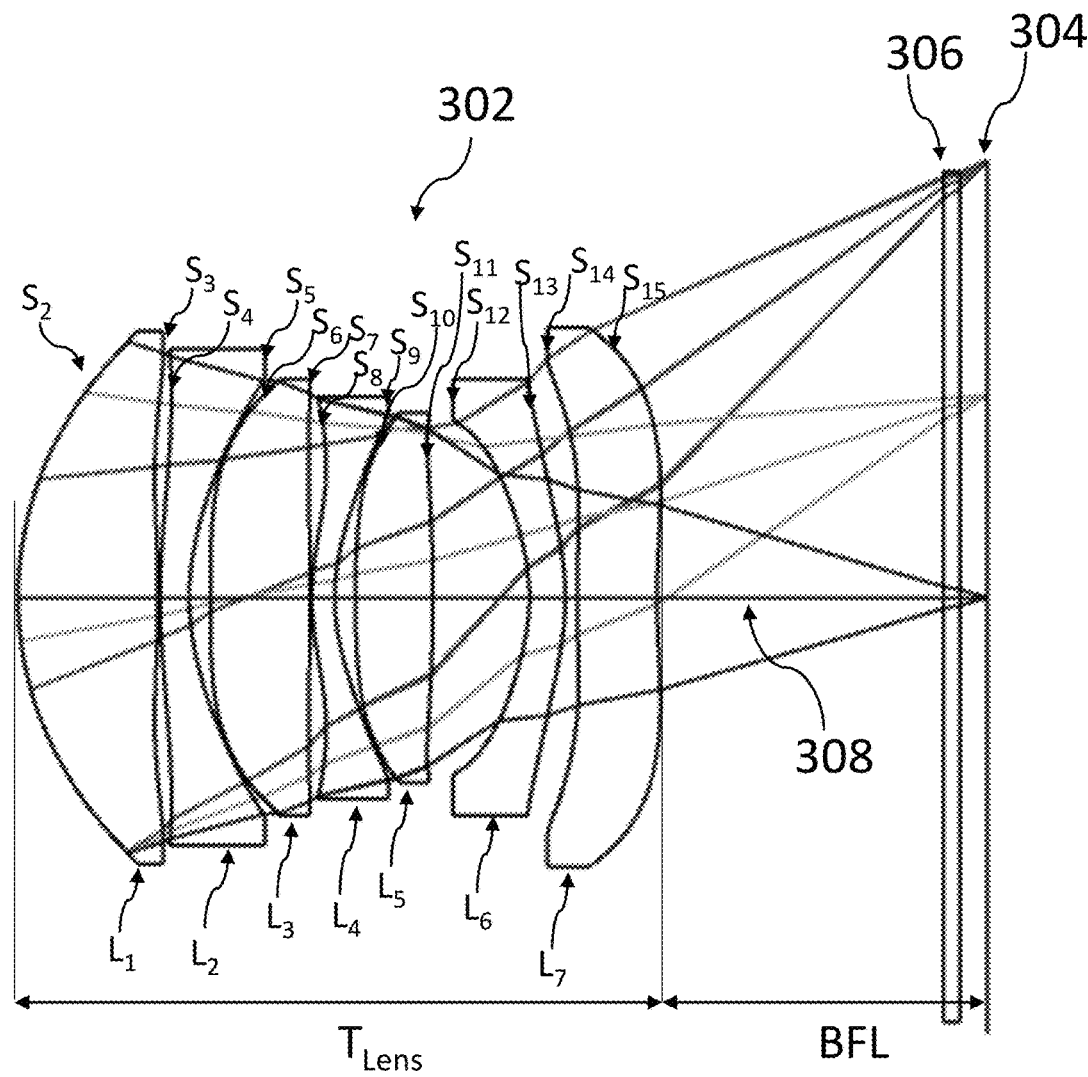
FIG. 3 shows an example of a pop-out optical lens system disclosed herein.

Optical rays pass through lens 302 and form an image on image sensor 304. FIG. 3 shows 3 fields with 3 rays for each: the upper marginal-ray, the lower marginal-ray and the chief-ray. All further figures show these 3 rays as well.

Detailed optical data and surface data for pop-out lens 302 are given in Tables 2-3. Table 2 provides surface types and Table 3 provides aspheric coefficients.

The surface types are:

a) Plano: flat surfaces, no curvature b) Q type 1 (QT1) surface sag formula:

$$z(r) = \frac{cr^2}{1 + \sqrt{1 - (1+k)c^2 r^2}} + D_{con}(u) \quad \text{(Eq. 1)}$$

$$D_{con}(u) = u^4 \sum_{n=0}^{N} A_n Q_n^{con}(u^2)$$

$$u = \frac{r}{r_{norm}}, x = u^2$$

$$Q_0^{con}(x) = 1 \quad Q_1^{con} = -(5 - 6x) \quad Q_2^{con} = 15 - 14x(3 - 2x)$$

$$Q_3^{con} = -\{35 - 12x[14 - x(21 - 10x)]\}$$

$$Q_4^{con} = 70 - 3x\{168 - 5x[84 - 11x(8 - 3x)]\}$$

TABLE 1

|  | 300 | 400 | 500 | 600 | 700 | 800 | 900 | 1000 | 1100 | MIN | MAX |
|---|---|---|---|---|---|---|---|---|---|---|---|
| N | 7 | 7 | 7 | 6 | 7 | 7 | 7 | 7 | 7 | | |
| TTL | 12.50 | 12.90 | 13.00 | 12.40 | 13.00 | 12.80 | 12.40 | 12.60 | 12.62 | 12.40 | 13.00 |
| c-$TTL_{MIN}$ | 8.49 | 8.49 | 8.49 | 8.40 | 8.40 | 8.40 | 8.40 | 8.40 | 8.50 | 8.40 | 8.50 |
| c-$TTL_{MID}$ | 9.29 | 9.29 | 9.29 | 9.20 | 9.20 | 9.20 | 9.20 | 9.20 | 9.30 | 9.20 | 9.30 |
| c-$TTL_{MAX}$ | 12.10 | 12.50 | 12.60 | 12.00 | 12.60 | 12.40 | 12.00 | 12.20 | 12.22 | 12.00 | 12.60 |
| EFL | 12.00 | 13.00 | 12.91 | 12.00 | 12.70 | 12.00 | 12.00 | 12.00 | 12.90 | 12.00 | 13.00 |
| BFL | 4.21 | 4.60 | 4.71 | 4.20 | 4.80 | 4.60 | 4.20 | 4.40 | 4.32 | 4.20 | 4.80 |
| c-$BFL_{MIN}$ | 0.20 | 0.20 | 0.20 | 0.20 | 0.20 | 0.20 | 0.20 | 0.20 | 0.20 | | |
| c-$BFL_{MID}$ | 1.00 | 1.00 | 1.00 | 1.00 | 1.00 | 1.00 | 1.00 | 1.00 | 1.00 | | |
| c-$BFL_{MAX}$ | 3.81 | 4.20 | 4.31 | 3.80 | 4.40 | 4.20 | 3.80 | 4.00 | 3.92 | 3.80 | 4.40 |
| SD | 11.20 | 11.20 | 11.20 | 11.50 | 11.20 | 11.20 | 11.20 | 11.20 | 8.00 | 8.00 | 11.50 |
| HFOV | 24.25 | 22.80 | 22.65 | 23.15 | 23.50 | 24.00 | 24.60 | 24.40 | 16.98 | 16.98 | 24.60 |
| $T_{Lens}$ | 8.30 | 8.29 | 8.29 | 8.20 | 8.23 | 8.23 | 8.23 | 8.24 | 8.30 | 8.20 | 8.30 |
| $DA_{L1}$ | 6.82 | 6.80 | 7.00 | 6.66 | 7.10 | 6.78 | 7.18 | 6.86 | 8.00 | 6.66 | 8.00 |
| $DA_{LN}$ | 6.90 | 6.81 | 6.66 | 6.63 | 6.56 | 6.22 | 6.40 | 6.46 | 5.24 | 5.24 | 6.90 |
| $DA_{MIN}$ | 4.98 | 4.964 | 5.014 | 5.56 | 5.10 | 4.80 | 4.68 | 4.88 | 4.25 | 4.25 | 5.56 |
| #$DA_{MIN}$ | 5 | 5 | 5 | 4 | 4 | 5 | 5 | 5 | 5 | | |
| f/# | 1.82 | 1.91 | 1.84 | 1.80 | 1.79 | 1.84 | 1.82 | 1.81 | 1.61 | 1.61 | 1.91 |
| Power sequence | +−+−+− | +−−++− | +−+−+− | +−+−+ | +−+−+− | +−+−+− | +−+−+− | −+−+− | +−+− | | |
| 35 mm Eq. FL | 46.39 | 50.26 | 49.90 | 45.18 | 49.10 | 46.39 | 46.39 | 46.39 | 69.82 | 45.18 | 69.82 |
| c-$BFL_{MIN}$/BFL | 0.05 | 0.04 | 0.04 | 0.05 | 0.04 | 0.04 | 0.05 | 0.05 | 0.05 | 0.04 | 0.05 |
| c-$BFL_{MAX}$/BFL | 0.91 | 0.91 | 0.92 | 0.90 | 0.92 | 0.91 | 0.90 | 0.91 | 0.91 | 0.90 | 0.92 |
| BFL/TTL | 0.34 | 0.36 | 0.36 | 0.34 | 0.37 | 0.36 | 0.34 | 0.35 | 0.34 | 0.34 | 0.37 |
| c-$TTL_{MAX}$/TTL | 0.97 | 0.97 | 0.97 | 0.97 | 0.97 | 0.97 | 0.97 | 0.97 | 0.97 | 0.97 | 0.97 |
| c-$TTL_{MIN}$/TTL | 0.68 | 0.66 | 0.65 | 0.68 | 0.65 | 0.66 | 0.68 | 0.67 | 0.67 | 0.65 | 0.68 |
| TTL/EFL | 1.04 | 0.99 | 1.01 | 1.03 | 1.02 | 1.07 | 1.03 | 1.05 | 0.98 | 0.98 | 1.07 |
| c-$TTL_{MAX}$/EFL | 1.01 | 0.96 | 0.98 | 1.00 | 0.99 | 1.03 | 1.00 | 1.02 | 0.95 | 0.95 | 1.03 |
| c-$TTL_{MID}$/EFL | 0.77 | 0.71 | 0.72 | 0.77 | 0.72 | 0.77 | 0.77 | 0.77 | 0.72 | 0.71 | 0.77 |
| c-$TTL_{MIN}$/EFL | 0.71 | 0.65 | 0.66 | 0.70 | 0.66 | 0.70 | 0.70 | 0.70 | 0.66 | 0.65 | 0.71 |
| $T_{Lens}$/TTL | 0.66 | 0.64 | 0.64 | 0.66 | 0.63 | 0.64 | 0.66 | 0.65 | 0.66 | 0.63 | 0.66 |
| $DA_{L1}$/$DA_{MIN}$ | 1.37 | 1.37 | 1.40 | 1.20 | 1.39 | 1.41 | 1.53 | 1.41 | 1.88 | 1.20 | 1.88 |
| $DA_{LN}$/$DA_{MIN}$ | 1.39 | 1.37 | 1.33 | 1.19 | 1.29 | 1.30 | 1.37 | 1.32 | 1.23 | 1.19 | 1.39 |
| $DA_{L1}$/$DA_{LN}$ | 0.99 | 1.00 | 1.05 | 1.00 | 1.08 | 1.09 | 1.12 | 1.06 | 1.53 | 0.99 | 1.53 |

FIG. 3 shows an example of a pop-out optical lens system disclosed herein and numbered 300. Lens system 300 comprises a pop-out lens 302, an image sensor 304 and, optionally, an optical element ("window") 306. Optical element -continued $$Q_5^{con} = -[126 - x(1260 - 11x\{420 - x[720 - 13x(45 - 14x)]\})]$$

-continued c) Even Asphere (ASP) surface sag formula:

$$z(r) = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16} \quad \text{(Eq. 2)}$$

where {z, r} are the standard cylindrical polar coordinates, c is the paraxial curvature of the surface, k is the conic parameter, $r_{norm}$ is generally one half of the surface's clear aperture ("CA", or also "DA" for clear aperture diameter), and $A_n$ are the aspheric coefficients shown in lens data tables. The Z axis is positive towards image. Values for CA are given as a clear aperture radius, i.e. D/2.

TABLE 2

Example 300
EFL = 12 mm, F number = 1.82, HFOV = 24.25 deg.

| Surface # | Comment | Type | Curvature Radius | Thickness | Aperture Radius(D/2) | Material | Index | Abbe # | Focal Length |
|---|---|---|---|---|---|---|---|---|---|
| 1 | A.S. | Plano | Infinity | −1.359 | 3.300 | | | | |
| 2 | Lens 1 | QT1 | 4.325 | 1.810 | 3.410 | Glass | 1.58 | 60.7 | 5.882 |
| 3 | | | −14.312 | 0.026 | 3.254 | | | | |
| 4 | Lens 2 | QT1 | 7.644 | 0.376 | 3.176 | Plastic | 1.61 | 25.6 | −8.880 |
| 5 | | | 3.136 | 0.275 | 2.806 | | | | |
| 6 | Lens 3 | QT1 | 190.275 | 1.280 | 2.808 | Plastic | 1.53 | 55.7 | 51.241 |
| 7 | | | −32.062 | 0.023 | 2.676 | | | | |
| 8 | Lens 4 | QT1 | 3.387 | 0.293 | 2.620 | Plastic | 1.61 | 25.6 | −21.303 |
| 9 | | | 2.605 | 0.268 | 2.501 | | | | |
| 10 | Lens 5 | QT1 | 16.362 | 1.006 | 2.487 | Plastic | 1.67 | 19.2 | 13.648 |
| 11 | | | −20.697 | 1.242 | 2.368 | | | | |
| 12 | Lens 6 | QT1 | −2.518 | 0.463 | 2.304 | Plastic | 1.61 | 25.6 | −20.435 |
| 13 | | | −3.365 | 0.150 | 2.787 | | | | |
| 14 | Lens 7 | QT1 | 12.824 | 1.039 | 3.087 | Plastic | 1.53 | 55.7 | −67.173 |
| 15 | | | 9.191 | 3.696 | 3.452 | | | | |
| 16 | Filter | Plano | Infinity | 0.210 | — | Glass | 1.52 | 64.2 | |
| 17 | | | Infinity | 0.350 | — | | | | |
| 18 | Image | Plano | Infinity | — | — | | | | |

The reference wavelength is 555.0 nm. Units in Table 2 are in mm except for refraction index ("Index") and Abbe #. Each lens element Li has a respective focal length fi given in Table 2. The POV is given as half FOV (HPOV). The definitions for surface types, Z axis, CA values, reference wavelength, units, focal length and HPOV are valid for all following Tables.

TABLE 3

| Surface # | Norm Radius | Aspheric Coefficients | | | |
|---|---|---|---|---|---|
| | | A0 | A1 | A2 | A3 |
| 2 | 4.818 | −5.84E+00 | −2.28E+00 | 3.37E−01 | 9.29E−01 |
| 3 | 5.297 | −1.50E+00 | −1.92E+00 | −2.04E−01 | −2.45E−02 |
| 4 | 5.072 | −2.60E+00 | 4.75E−01 | 3.09E−01 | 4.07E−01 |
| 5 | 3.138 | −1.33E+00 | −1.29E−01 | −1.10E−01 | −3.58E−02 |
| 6 | 6.262 | −1.02E+02 | −3.18E+01 | −7.44E+00 | −1.15E+01 |
| 7 | 3.511 | 1.10E+00 | 5.70E−01 | 1.94E−01 | −2.08E−01 |
| 8 | 4.512 | −4.73E−01 | 8.42E−01 | −4.05E+00 | −3.01E+00 |
| 9 | 1.949 | −3.60E−01 | 1.15E−02 | −4.30E−04 | −1.81E−03 |
| 10 | 2.231 | 3.05E−01 | −4.79E−03 | −2.92E−03 | 1.62E−03 |
| 11 | 2.558 | 7.94E−02 | −1.19E−02 | −5.52E−02 | −6.55E−02 |
| 12 | 4.703 | −4.62E+01 | 2.95E−01 | 7.01E+00 | −4.39E+00 |
| 13 | 2.786 | 1.05E+00 | −8.70E−02 | 3.27E−02 | −3.26E−03 |
| 14 | 3.511 | 2.22E+00 | 4.23E+00 | 3.95E+00 | 3.53E+00 |
| 15 | 3.203 | −1.18E+00 | 7.33E−02 | −2.73E−02 | 3.18E−03 |

TABLE 3-continued

| Surface # | Aspheric Coefficients (Continued) | | | | |
|---|---|---|---|---|---|
| | A4 | A5 | A6 | A7 | A8 |
| 2 | 2.55E−01 | −4.03E−01 | −5.15E−01 | −2.92E−01 | −7.71E−02 |
| 3 | 6.92E−02 | 5.41E−02 | 6.11E−02 | 1.22E−01 | 1.40E−01 |
| 4 | −3.18E−02 | −3.78E−01 | −4.09E−01 | −1.26E−01 | 1.20E−01 |
| 5 | −1.95E−02 | −4.06E−03 | −2.25E−04 | 2.29E−03 | 2.35E−03 |
| 6 | −3.41E+00 | 3.78E+00 | 1.27E+00 | −7.74E−01 | 1.98E−01 |
| 7 | −3.94E−01 | −3.49E−01 | −1.79E−01 | −3.14E−02 | 3.18E−02 |
| 8 | −6.21E−01 | 4.85E−01 | 3.07E−01 | 3.02E−01 | 7.10E−01 |
| 9 | 6.25E−04 | −1.92E−04 | 3.48E−05 | −6.75E−06 | 5.22E−07 |
| 10 | 3.49E−04 | −3.90E−04 | 6.03E−05 | 1.47E−05 | 2.10E−06 |
| 11 | −5.72E−02 | −4.07E−02 | −2.57E−02 | −1.47E−02 | −7.61E−03 |
| 12 | −3.77E−02 | 9.13E+00 | 8.19E+00 | 2.36E+00 | 1.08E−01 |
| 13 | 3.42E−03 | 9.18E−04 | 4.23E−04 | −5.95E−04 | −1.95E−05 |
| 14 | 2.81E+00 | 2.04E+00 | 1.33E+00 | 7.72E−01 | 3.84E−01 |
| 15 | −2.14E−03 | 2.69E−04 | −3.24E−05 | 4.46E−05 | 4.25E−05 |

| Surface # | Aspheric Coefficients (Continued) | | | |
|---|---|---|---|---|
| | A9 | A10 | A11 | A12 |
| 2 | 9.14E−03 | 1.51E−02 | 5.00E−03 | 5.42E−04 |
| 3 | 8.26E−02 | 1.93E−02 | −1.32E−03 | −1.37E−03 |
| 4 | 1.77E−01 | 1.07E−01 | 3.79E−02 | 6.17E−03 |
| 5 | 1.94E−03 | 1.22E−03 | 5.04E−04 | 1.52E−04 |
| 6 | −2.57E−01 | −1.27E+00 | −9.24E−01 | −2.16E−01 |
| 7 | 3.20E−02 | 1.49E−02 | 3.73E−03 | 3.46E−04 |
| 8 | 8.34E−01 | 5.46E−01 | 2.00E−01 | 3.39E−02 |
| 9 | 1.59E−07 | −1.88E−08 | 1.50E−10 | −4.79E−10 |
| 10 | −2.65E−06 | 1.04E−06 | −3.65E−07 | 4.96E−09 |
| 11 | −3.44E−03 | −1.32E−03 | −3.80E−04 | −7.36E−05 |
| 12 | 6.33E−01 | 7.93E−01 | 3.54E−01 | 6.15E−02 |
| 13 | −1.04E−04 | 8.37E−06 | −2.47E−05 | −8.41E−06 |
| 14 | 1.57E−01 | 5.00E−02 | 1.12E−02 | 1.42E−03 |
| 15 | −6.03E−06 | 8.84E−06 | −7.22E−06 | 2.52E−06 |

S3, i.e. the rear surface of L1, has a deflection point which is not located at the optical axis ("OA"). Each air gap between L1, L2, L3 and LA is <0.5 mm, what allows a small $T_{Lens}$ and thus a small c-TTL. The ratio of an air gap between L1 and L2 ("d12"), L2 and L3 ("d23") and L3 and L4

("d34") and the TTL respectively is d12/TTL, d23/TTL, d34/TTL<5%. This is valid not only for optical lens system 300, but also for optical lens systems 400 and 500.

L1 and LN (here: L7) have a DAi that is larger by >30% than a smallest DAi present in the lens (here: L5), i.e. $DA_{L1}/DA_{L5}$, $DA_{L7}/DA_{L5}>1.3$. A smallest DAi is present at a lens element at the lens center, so that a DAi profile along the z-axis has a local maximum at L1 and LN respectively, and a minimum at the lens center. "A lens element at the lens center" is a lens element LM which is not located at the beginning or at the end of the lens. Specifically, "a lens element at the lens center" is a lens element LM which is not L1, L2, LN−1, LN. For all optical lens systems 400-1100 disclosed herein, M=4 or M=5 and $DA_{L1}/DA_{LM}$, $DA_{LN}/DA_{LM}>1.15$. This property is beneficial for achieving a pop-out Tele camera that has both a relatively large DA (i.e. a relatively low f/#<2) and a relatively large SD (e.g. SD>8 mm).

L1 and LN have a similar DAi. For all optical lens systems 400-1100 disclosed herein, the ratio of $DA_{L1}$ and $DA_{LN}$ fulfils $0.9<DA_{L1}/DA_{LN}<1.15$.

Figure 4:
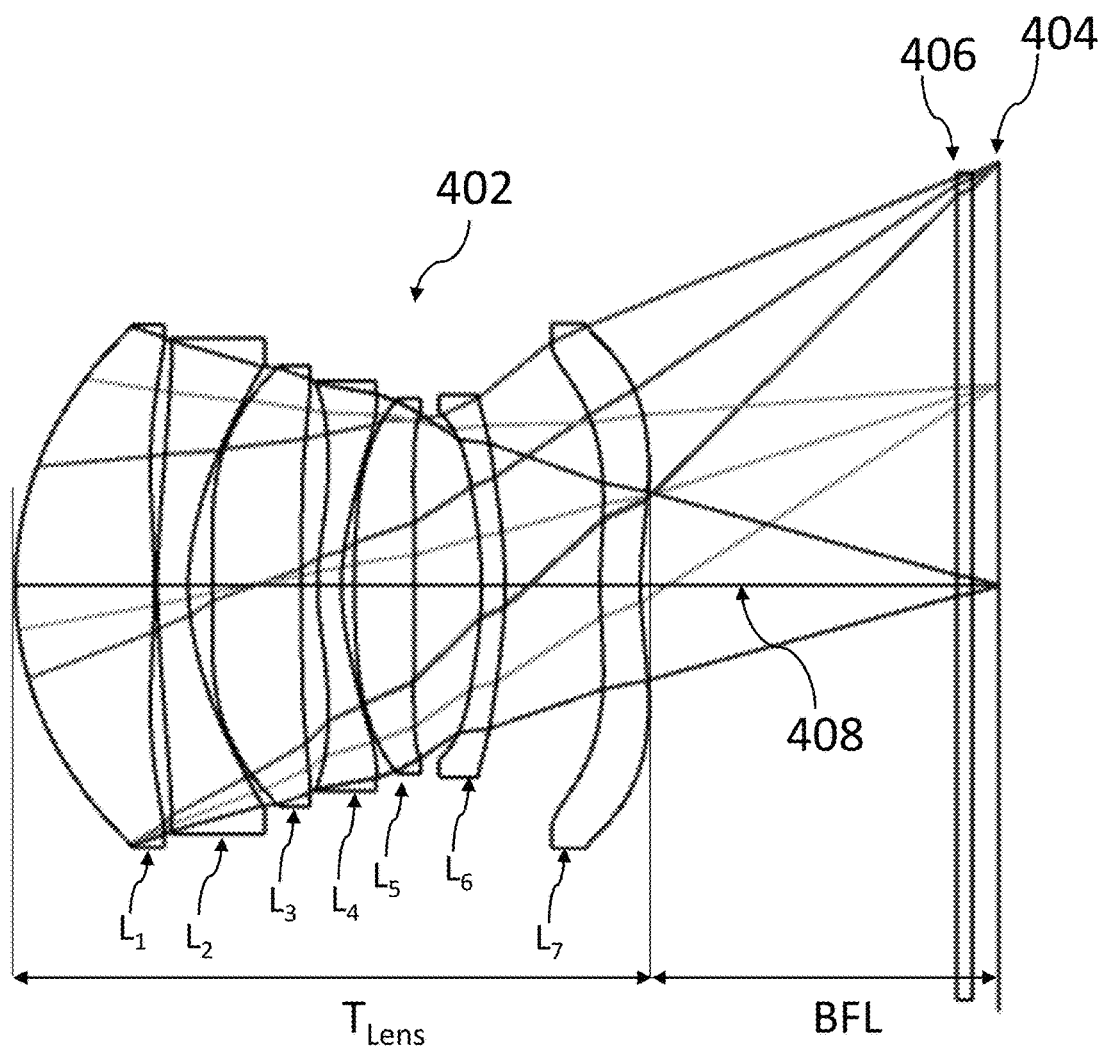
FIG. 4 shows another example of a pop-out optical lens system disclosed herein.

FIG. 4 shows an example of a pop-out optical lens system disclosed herein and numbered 400. Lens system 400 comprises a pop-out lens 402, an image sensor 404 and, optionally, an optical element 406. Pop-out lens 402 has a lens optical axis 408. Table 4 provides surface types and Table 5 provides aspheric coefficients. An air gap or distance ("$d_{L6-L7}$") between L6 and L7 is relatively large, $d_{L6-L7}=1.246$ mm, and a ratio of $d_{L6-L7}$ and $T_{Lens}$ is $d_{L6-L7}/T_{Lens}=0.15$.

TABLE 4

Example 400
EFL = 13 mm, F number = 1.9, HFOV = 22.8 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −1.470 | 3.400 | | | | |
| 2 | Lens 1 | QT1 | 4.389 | 1.824 | 3.400 | Glass | 1.58 | 60.7 | 5.695 |
| 3 | | | −11.768 | 0.037 | 3.260 | | | | |
| 4 | Lens 2 | QT1 | 8.213 | 0.407 | 3.215 | Plastic | 1.61 | 25.6 | −8.600 |
| 5 | | | 3.168 | 0.319 | 2.876 | | | | |
| 6 | Lens 3 | QT1 | −30.654 | 1.164 | 2.863 | Plastic | 1.53 | 55.7 | −24.292 |
| 7 | | | 22.977 | 0.207 | 2.715 | | | | |
| 8 | Lens 4 | QT1 | 3.152 | 0.314 | 2.668 | Plastic | 1.61 | 25.6 | 55.624 |
| 9 | | | 3.338 | 0.171 | 2.554 | | | | |
| 10 | Lens 5 | QT1 | 33.462 | 0.793 | 2.482 | Plastic | 1.67 | 19.2 | 28.196 |
| 11 | | | −44.015 | 0.873 | 2.378 | | | | |
| 12 | Lens 6 | QT1 | −5.763 | 0.308 | 2.347 | Plastic | 1.61 | 25.6 | −105.030 |
| 13 | | | −6.453 | 1.246 | 2.532 | | | | |
| 14 | Lens 7 | QT1 | 7.085 | 0.526 | 3.204 | Plastic | 1.54 | 55.9 | −28.785 |
| 15 | | | 4.756 | 4.147 | 3.407 | | | | |
| 16 | Filter | Plano | Infinity | 0.210 | — | Glass | 1.52 | 64.2 | |
| 17 | | | Infinity | 0.350 | — | | | | |
| 18 | Image | Plano | Infinity | — | — | | | | |

TABLE 5

| Surface # | Norm Radius | A0 | A1 | A2 | A3 |
|---|---|---|---|---|---|
| 2 | 4.818 | −5.65E+00 | −2.57E+00 | 1.47E−01 | 1.11E+00 |
| 3 | 5.297 | −5.02E−01 | −2.49E+00 | −7.79E−01 | −1.70E−01 |
| 4 | 5.072 | −2.34E+00 | 1.49E−01 | 1.61E−01 | 3.96E−01 |
| 5 | 3.138 | −1.23E+00 | −5.56E−02 | −4.23E−02 | 2.30E−02 |
| 6 | 6.262 | −1.13E+02 | −3.23E+01 | −7.01E+00 | −1.26E+01 |
| 7 | 3.511 | 7.79E−01 | 7.09E−01 | 2.31E−01 | −1.48E−01 |
| 8 | 4.512 | −7.07E−01 | 1.17E+00 | −4.49E+00 | −3.26E+00 |
| 9 | 1.949 | −2.68E−01 | 2.19E−02 | 4.60E−05 | −3.15E−03 |
| 10 | 2.231 | 3.49E−01 | −2.26E−02 | 7.10E−03 | −3.62E−03 |
| 11 | 2.558 | 1.54E−01 | −3.15E−02 | −7.81E−02 | −8.87E−02 |
| 12 | 4.703 | −4.93E+01 | 8.71E−01 | 6.35E+00 | −4.09E+00 |
| 13 | 2.786 | 3.15E−01 | 4.54E−02 | 6.87E−02 | 3.29E−02 |
| 14 | 3.511 | −1.92E+00 | 5.69E−01 | 1.32E−01 | 1.09E−01 |
| 15 | 3.203 | −1.87E+00 | 1.47E−01 | −4.67E−02 | 1.14E−02 |

| Surface # | A4 | A5 | A6 | A7 | A8 |
|---|---|---|---|---|---|
| 2 | 5.96E−01 | −2.51E−01 | −6.63E−01 | −5.77E−01 | −3.05E−01 |
| 3 | 2.60E−01 | 1.88E−01 | −4.57E−03 | 1.91E−02 | 1.43E−01 |
| 4 | 9.02E−04 | −4.09E−01 | −5.12E−01 | −1.92E−01 | 1.41E−01 |
| 5 | 1.33E−02 | 1.20E−02 | 8.76E−03 | 5.29E−03 | 3.39E−03 |
| 6 | −3.53E+00 | 4.18E+00 | 1.17E+00 | −8.96E−01 | 4.16E−01 |
| 7 | −4.10E−01 | −3.54E−01 | −2.05E−01 | −5.07E−02 | 8.73E−03 |
| 8 | −6.37E−01 | 5.01E−01 | 1.26E−01 | 2.01E−01 | 7.81E−01 |
| 9 | 1.05E−03 | −2.39E−04 | 4.03E−05 | −6.01E−07 | −1.19E−06 |
| 10 | 2.40E−03 | −5.32E−04 | −4.37E−05 | 7.04E−05 | −2.27E−05 |
| 11 | −7.49E−02 | −5.24E−02 | −3.29E−02 | −1.91E−02 | −9.99E−03 |
| 12 | −3.96E−02 | 8.65E+00 | 8.06E+00 | 2.49E+00 | 1.03E−01 |
| 13 | −6.20E−03 | −7.21E−03 | −7.67E−03 | −5.90E−03 | −3.24E−03 |
| 14 | 4.15E−02 | 4.15E−02 | 3.72E−02 | 2.82E−02 | 1.62E−02 |
| 15 | −2.08E−03 | 1.13E−03 | 7.13E−05 | 9.58E−05 | 2.12E−07 |

| Surface # | A9 | A10 | A11 | A12 |
|---|---|---|---|---|
| 2 | −1.01E−01 | −1.66E−02 | 9.93E−04 | 6.86E−04 |
| 3 | 1.73E−01 | 9.93E−02 | 2.97E−02 | 4.10E−03 |
| 4 | 2.40E−01 | 1.55E−01 | 5.61E−02 | 1.06E−02 |

TABLE 5-continued

| | | | | |
|---|---|---|---|---|
| 5 | 1.86E−03 | 9.76E−04 | 3.58E−04 | 1.15E−04 |
| 6 | −1.64E−01 | −1.50E+00 | −1.14E+00 | −2.70E−01 |
| 7 | 1.56E−02 | 4.50E−03 | −2.18E−06 | −5.60E−04 |
| 8 | 1.03E+00 | 6.95E−01 | 2.63E−01 | 4.47E−02 |
| 9 | 1.15E−07 | 2.79E−08 | −6.42E−09 | 3.83E−10 |
| 10 | −6.77E−06 | 1.11E−05 | −4.16E−06 | 4.94E−07 |
| 11 | −4.49E−03 | −1.77E−03 | −5.22E−04 | −1.22E−04 |
| 12 | 6.57E−01 | 8.92E−01 | 4.15E−01 | 7.24E−02 |
| 13 | −1.40E−03 | −4.61E−04 | −1.04E−04 | −9.99E−06 |
| 14 | 7.03E−03 | 2.39E−03 | 6.83E−04 | 1.66E−04 |
| 15 | 2.55E−06 | 6.27E−06 | −4.67E−06 | 4.28E−06 |

Figure 5:
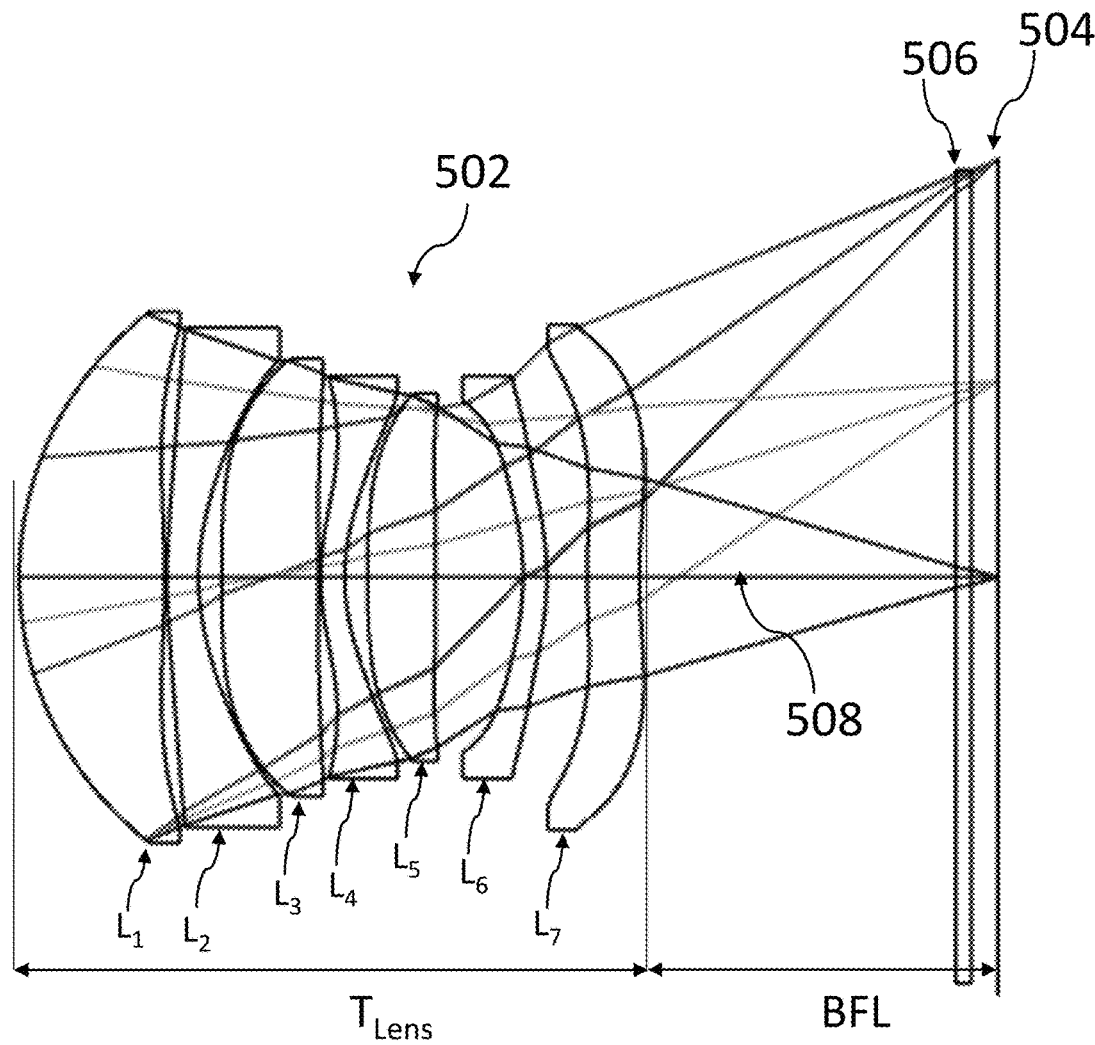
FIG. 5 shows yet another example of a pop-out optical lens system disclosed herein.

FIG. 5 shows an example of a pop-out optical lens system disclosed herein and numbered 500. Lens system 500 comprises a pop-out lens 502 having a lens optical axis 508, an image sensor 504 and, optionally, an optical element 506. Table 6 provides surface types and Table 7 provides aspheric coefficients.

TABLE 6

Example 500
EFL = 12.9 mm, F number = 1.84, HFOV = 22.65 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −1.636 | 3.500 | | | | |
| 2 | Lens 1 | QT1 | 4.384 | 1.930 | 3.500 | Glass | 1.58 | 60.7 | 6.055 |
| 3 | | | −15.530 | 0.036 | 3.329 | | | | |
| 4 | Lens 2 | QT1 | 7.937 | 0.414 | 3.294 | Plastic | 1.61 | 25.6 | −8.341 |
| 5 | | | 3.064 | 0.312 | 2.887 | | | | |
| 6 | Lens 3 | QT1 | 64.934 | 1.275 | 2.881 | Plastic | 1.53 | 55.7 | 86.638 |
| 7 | | | −162.497 | 0.036 | 2.721 | | | | |
| 8 | Lens 4 | QT1 | 3.452 | 0.314 | 2.674 | Plastic | 1.61 | 25.6 | −24.468 |
| 9 | | | 2.713 | 0.304 | 2.520 | | | | |
| 10 | Lens 5 | QT1 | 12.419 | 0.904 | 2.507 | Plastic | 1.67 | 19.2 | 16.224 |
| 11 | | | −92.203 | 1.165 | 2.416 | | | | |
| 12 | Lens 6 | QT1 | −3.374 | 0.315 | 2.368 | Plastic | 1.61 | 25.6 | −49.211 |
| 13 | | | −3.930 | 0.535 | 2.681 | | | | |
| 14 | Lens 7 | QT1 | 9.697 | 0.689 | 3.112 | Plastic | 1.54 | 55.9 | −40.917 |
| 15 | | | 6.592 | 4.210 | 3.328 | | | | |
| 16 | Filter | Plano | Infinity | 0.210 | — | Glass | 1.52 | 64.2 | |
| 17 | | | Infinity | 0.350 | — | | | | |
| 18 | Image | Plano | Infinity | — | — | | | | |

TABLE 7

| Surface # | Norm Radius | Aspheric Coefficients | | | |
|---|---|---|---|---|---|
| | | A0 | A1 | A2 | A3 |
| 2 | 4.818 | −4.17E+00 | −2.22E+00 | −1.70E−01 | 8.96E−01 |
| 3 | 5.297 | −6.95E−03 | −2.18E+00 | −8.39E−01 | −2.12E−01 |
| 4 | 5.072 | −2.73E+00 | 3.41E−02 | 2.50E−01 | 4.88E−01 |
| 5 | 3.138 | −1.54E+00 | −2.31E−01 | −2.34E−01 | −1.29E−01 |
| 6 | 6.262 | −1.13E+02 | −3.43E+01 | −7.39E+00 | −1.20E+01 |
| 7 | 3.511 | 9.75E−01 | 5.49E−01 | 2.24E−01 | −1.88E−01 |
| 8 | 4.512 | 2.11E−01 | 7.10E−01 | −4.19E+00 | −3.14E+00 |
| 9 | 1.949 | −3.07E−01 | 3.39E−03 | 1.44E−03 | −2.16E−03 |
| 10 | 2.231 | 2.48E−03 | 2.87E−03 | −3.98E−03 | 1.75E−03 |
| 11 | 2.558 | 1.08E−02 | 2.92E−03 | −8.99E−03 | −2.26E−02 |
| 12 | 4.703 | −6.27E+01 | 5.82E−01 | 8.22E+00 | −4.91E+00 |
| 13 | 2.786 | 7.39E−01 | −7.48E−02 | 2.88E−02 | 1.10E−02 |
| 14 | 3.511 | 1.89E+00 | 4.44E+00 | 4.09E+00 | 3.70E+00 |
| 15 | 3.203 | −1.56E+00 | 1.03E−01 | −4.51E−02 | 5.56E−03 |

TABLE 7-continued

| Surface # | Aspheric Coefficients (Continued) | | | | |
|---|---|---|---|---|---|
| | A4 | A5 | A6 | A7 | A8 |
| 2 | 8.11E−01 | 2.11E−01 | −2.57E−01 | −3.73E−01 | −2.66E−01 |
| 3 | 1.74E−01 | 1.59E−01 | −7.10E−05 | −1.54E−02 | 1.14E−01 |
| 4 | −1.57E−03 | −3.45E−01 | −3.76E−01 | −1.13E−01 | 1.18E−01 |
| 5 | −9.73E−02 | −5.86E−02 | −3.65E−02 | −2.06E−02 | −1.13E−02 |
| 6 | −3.83E+00 | 4.14E+00 | 1.33E+00 | −1.07E+00 | 2.43E−01 |
| 7 | −3.84E−01 | −3.68E−01 | −2.13E−01 | −6.15E−02 | 1.98E−02 |
| 8 | −6.15E−01 | 5.03E−01 | 3.29E−01 | 2.87E−01 | 6.96E−01 |
| 9 | 9.05E−04 | −2.73E−04 | 3.77E−05 | −9.24E−08 | −1.03E−06 |
| 10 | 8.00E−04 | −5.76E−04 | 8.47E−05 | 2.46E−05 | −2.89E−06 |
| 11 | −2.48E−02 | −1.86E−02 | −1.22E−02 | −7.47E−03 | −4.13E−03 |
| 12 | 1.83E−01 | 9.71E+00 | 8.02E+00 | 1.98E+00 | 8.96E−02 |
| 13 | −2.03E−03 | 9.06E−04 | −1.89E−03 | −1.97E−03 | −1.24E−03 |
| 14 | 2.97E+00 | 2.20E+00 | 1.47E+00 | 8.83E−01 | 4.59E−01 |
| 15 | −3.02E−03 | 1.18E−03 | 2.08E−04 | 3.39E−04 | 1.28E−04 |

TABLE 7-continued

| Surface # | Aspheric Coefficients (Continued) | | | |
|---|---|---|---|---|
| | A9 | A10 | A11 | A12 |
| 2 | −1.25E−01 | −4.02E−02 | −8.36E−03 | −9.12E−04 |
| 3 | 2.02E−01 | 1.57E−01 | 6.58E−02 | 1.23E−02 |
| 4 | 1.82E−01 | 1.17E−01 | 4.20E−02 | 6.75E−03 |
| 5 | −5.10E−03 | −1.98E−03 | −5.94E−04 | −9.99E−05 |
| 6 | −1.24E−01 | −1.47E+00 | −1.18E+00 | −2.95E−01 |
| 7 | 3.45E−02 | 2.09E−02 | 7.09E−03 | 1.20E−03 |
| 8 | 8.62E−01 | 5.96E−01 | 2.33E−01 | 4.27E−02 |
| 9 | 1.41E−07 | 2.72E−08 | −7.92E−09 | 4.13E−10 |
| 10 | −1.07E−05 | 6.96E−06 | −1.24E−06 | −1.33E−08 |
| 11 | −2.00E−03 | −8.07E−04 | −2.43E−04 | −5.07E−05 |
| 12 | 7.21E−01 | 7.30E−01 | 2.63E−01 | 3.34E−02 |
| 13 | −5.76E−04 | −3.12E−04 | −1.16E−04 | −4.44E−05 |

TABLE 7-continued

| | | | | |
|---|---|---|---|---|
| 14 | 1.99E−01 | 6.81E−02 | 1.66E−02 | 2.24E−03 |
| 15 | 6.66E−05 | 1.67E−05 | −9.37E−08 | 1.21E−05 |

Figure 6:
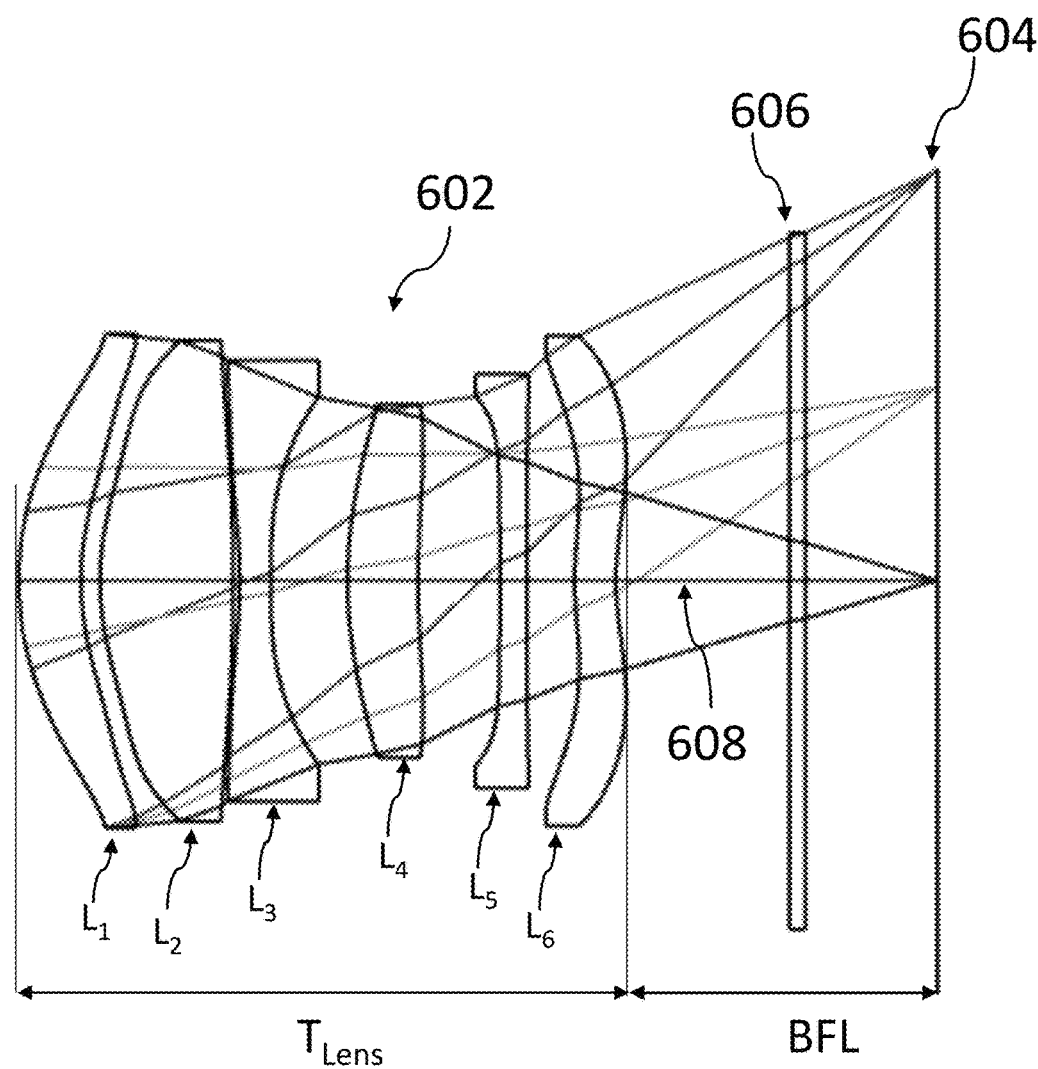
FIG. 6 shows yet another example of a pop-out optical lens system disclosed herein.

FIG. 6 shows an example of a pop-out optical lens system disclosed herein and numbered 600. Lens system 600 comprises a pop-out lens 602 having a lens optical axis 608, an image sensor 604 and, optionally, an optical element 606. Table 9 provides surface types and Table 10 provides aspheric coefficients.

A thickness of L2 is larger by >1.85 than a thickness of any other lens element in lens 602. The ratio of a thickness T2 of L2 along the OA and $T_{Lens}$ fulfils $T2/T_{Lens}$=0.22. A magnitude of L1's lens power is lower than a magnitude of any of the lens powers of any other lens element in lens 602. Distances $d_{L3-L4}$ and $d_{L4-L5}$ between L3, L4 and L4, L5 respectively are larger by >60% than any other distance between lens elements in lens 602.

L2, L3 are uniformly close to each other.

Herein is defined that a lens pair $L_i$, $L_{i+1}$ is "uniformly close to each other", if for all values between the optical axis ("OA") and $DA_{i/2}$ or $DA_{i+1/2}$ (i.e. a top or bottom margin of $L_i$ or $L_{i+1}$) along the y-axis, the lens pair fulfills all of these three criteria:

1. A maximum distance ("Max-d") between $L_i$ and $L_{i+1}$ measured along the z-axis at any position along the y-axis is Max-$d_{Li-Li+1}$<0.5 mm.
2. An average of the distance between $L_i$ and $L_{i+1}$ ("$\mu_{Li-Li+1}$") measured along the z-axis is $\mu_{Li-Li+1}$<0.15 mm,
3. A standard deviation of the average $\mu_{Li-Li+1}$ ("$\sigma_{Li-Li+1}$") is $\sigma_{Li-Li+1}$<0.075 mm. Lens pair L2, L3 is a "doublet lens", what is beneficial for achieving low chromatic aberration.

Herein, a lens pair $L_i$, $L_{i+1}$ is defined a "doublet lens" if it fulfils all of these three criteria:

1. Lens pair $L_i$, $L_{i+1}$ is uniformly close to each other according to above definition,
2. The ratio of the refractive index ("n") of $L_i$, $L_{i+1}$ is $n_{i+1} \geq n_i+0.03$,
3. The ratio of the Abbe number ("v") is $vi/v_{i+1}>1.3$.

Herein, a lens pair $L_i$, $L_{i+1}$ is defined an "inverted doublet lens", if it fulfils all of these three criteria:

1. Lens pair $L_i$, $L_{i+1}$ is uniformly close to each other,
2. The ratio of the refractive index ("n") of $L_i$, $L_{i+1}$ is $n_i \geq n_{i+1}+0.03$,
3. The ratio of the Abbe number ("v") is $v_{i+1}/v_i>1.3$.

Table 8 shows all doublet lenses and inverted doublet lenses that are included in the optical lens system examples 300-1100 disclosed herein as well as values thereof (Max-d, μ, σ given in mm, n and v given without units). "Type" specifies whether the lens pair is a doublet lens ("D") or an inverted doublet lens ("ID").

TABLE 8

| | 600 | 700 | 800 | 900 | 900 | 900 | 1000 | 1000 | 1000 | 1100 | 1100 |
|---|---|---|---|---|---|---|---|---|---|---|---|
| Lens pair | L2, L3 | L6, L7 | L6, L7 | L1, L2 | L3, L4 | L6, L7 | L1, L2 | L3, L4 | L6, L7 | L2, L3 | L4, L5 |
| Type | D | ID | ID | ID | ID | ID | ID | ID | ID | ID | D |
| Max-d | 0.098 | 0.073 | 0.106 | 0.260 | 0.309 | 0.159 | 0.274 | 0.169 | 0.143 | 0.117 | 0.094 |
| $\mu_{Li-Li+1}$ | 0.059 | 0.049 | 0.080 | 0.067 | 0.097 | 0.083 | 0.068 | 0.078 | 0.076 | 0.056 | 0.053 |
| $\sigma_{Li-Li+1}$ | 0.021 | 0.012 | 0.021 | 0.052 | 0.063 | 0.031 | 0.055 | 0.032 | 0.026 | 0.020 | 0.017 |
| $n_i$ | 1.59 | 1.67 | 1.67 | 1.64 | 1.66 | 1.67 | 1.67 | 1.61 | 1.57 | 1.61 | 1.61 |
| $n_{i+1}$ | 1.64 | 1.59 | 1.59 | 1.53 | 1.53 | 1.59 | 1.53 | 1.53 | 1.54 | 1.53 | 1.67 |
| $v_i$ | 61.1 | 19.2 | 19.2 | 23.5 | 20.4 | 19.2 | 19.2 | 25.6 | 37.4 | 25.6 | 25.6 |
| $v_{i+1}$ | 23.5 | 28.4 | 28.4 | 55.7 | 55.7 | 28.4 | 55.7 | 55.7 | 55.9 | 55.7 | 19.2 |
| $n_i - n_{i+1}$ | −0.05 | 0.08 | 0.08 | 0.11 | 0.13 | 0.08 | 0.14 | 0.08 | 0.03 | 0.08 | −0.06 |
| $v_i/v_{i+1}$ | 2.60 | | | | | | | | | | 1.33 |
| $v_{i+1}/v_i$ | | 1.48 | 1.48 | 2.37 | 2.73 | 1.48 | 2.90 | 2.18 | 1.49 | 2.18 | |

TABLE 9

Example 600
EFL = 12 mm, F number = 1.8, HFOV = 24.32 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. + Lens 1 | QT1 | 3.944 | 0.844 | 3.333 | Glass | 1.67 | 55.1 | 269.157 |
| 2 | | | 3.687 | 0.256 | 3.298 | | | | |
| 3 | Lens 2 | QT1 | 3.707 | 1.786 | 3.266 | Glass | 1.59 | 61.1 | 5.979 |
| 4 | | | −61.762 | 0.098 | 3.119 | | | | |
| 5 | Lens 3 | QT1 | −5.679 | 0.412 | 3.061 | Plastic | 1.64 | 23.5 | −6.682 |
| 6 | | | 18.276 | 1.042 | 2.625 | | | | |
| 7 | Lens 4 | QT1 | 5.675 | 0.949 | 2.750 | Plastic | 1.68 | 18.2 | 16.043 |
| 8 | | | 10.899 | 1.099 | 2.780 | | | | |
| 9 | Lens 5 | QT1 | 149.742 | 0.368 | 2.611 | Plastic | 1.68 | 18.2 | −256.457 |
| 10 | | | 80.868 | 0.639 | 2.884 | | | | |
| 11 | Lens 6 | QT1 | 4.656 | 0.564 | 3.072 | Plastic | 1.61 | 25.9 | −32.370 |
| 12 | | | 3.603 | 2.337 | 3.314 | | | | |
| 13 | Filter | Plano | Infinity | 0.210 | — | Glass | 1.52 | 64.2 | |
| 14 | | | Infinity | 1.790 | — | | | | |
| 15 | Image | Plano | Infinity | — | — | | | | |

TABLE 10

Aspheric Coefficients

| Surface # | Norm Radius | A0 | A1 | A2 |
|---|---|---|---|---|
| 1 | 3.343 | −5.54E−01 | −9.98E−02 | −2.00E−02 |
| 2 | 3.302 | −1.29E+00 | 4.09E−02 | −3.44E−02 |
| 3 | 3.169 | −9.08E−01 | 1.50E−01 | −3.28E−03 |
| 4 | 3.011 | −1.01E−01 | 3.75E−02 | −6.97E−03 |
| 5 | 2.961 | 7.77E−01 | −1.34E−01 | 3.64E−02 |
| 6 | 2.565 | 5.95E−01 | −6.52E−02 | 2.37E−02 |
| 7 | 2.756 | −2.11E−01 | 7.49E−03 | −9.79E−03 |
| 8 | 2.848 | −4.99E−01 | −1.71E−02 | −1.32E−02 |
| 9 | 2.781 | −5.48E−01 | −1.10E−01 | 4.12E−03 |
| 10 | 3.094 | −9.67E−03 | 4.60E−02 | 7.82E−03 |
| 11 | 3.332 | −2.20E+00 | 4.58E−01 | −7.81E−02 |
| 12 | 3.611 | −3.92E+00 | 1.28E−01 | −1.88E−01 |

Aspheric Coefficients (Continued)

| Surface # | A3 | A4 | A5 | A6 |
|---|---|---|---|---|
| 1 | −4.83E−03 | 5.99E−04 | 1.20E−04 | 3.77E−04 |
| 2 | −2.26E−02 | 4.25E−03 | 5.13E−04 | 5.81E−04 |
| 3 | −2.19E−02 | 2.79E−03 | −6.21E−04 | −4.75E−05 |
| 4 | −8.58E−04 | −5.64E−04 | −1.06E−03 | 6.98E−04 |
| 5 | −7.07E−03 | 8.64E−04 | −5.64E−04 | 4.55E−04 |
| 6 | −1.75E−03 | −8.87E−04 | 3.33E−04 | −9.18E−05 |
| 7 | −2.74E−03 | −1.53E−03 | −3.27E−04 | −1.67E−04 |
| 8 | −3.32E−03 | −1.55E−03 | −9.97E−05 | −1.58E−04 |
| 9 | 2.23E−02 | 5.52E−03 | 4.22E−03 | 8.07E−04 |
| 10 | 2.38E−02 | −3.60E−03 | 4.08E−03 | −5.02E−04 |
| 11 | 2.74E−02 | −9.70E−03 | −3.18E−03 | −6.84E−03 |
| 12 | 1.42E−02 | −8.70E−03 | 9.11E−03 | 2.43E−03 |

Aspheric Coefficients (Continued)

| Surface # | A7 | A8 | A9 |
|---|---|---|---|
| 1 | −1.10E−04 | — | — |
| 2 | −4.43E−04 | — | — |
| 3 | −1.31E−04 | — | — |
| 4 | −1.27E−04 | — | — |
| 5 | −1.25E−04 | — | — |
| 6 | −2.70E−05 | — | — |
| 7 | −6.71E−05 | — | — |
| 8 | −4.36E−05 | — | — |
| 9 | 1.87E−04 | — | — |
| 10 | 1.09E−04 | — | — |
| 11 | −4.22E−03 | −1.98E−03 | −7.14E−04 |
| 12 | 1.80E−03 | 1.30E−04 | −9.70E−05 |

Figure 7:
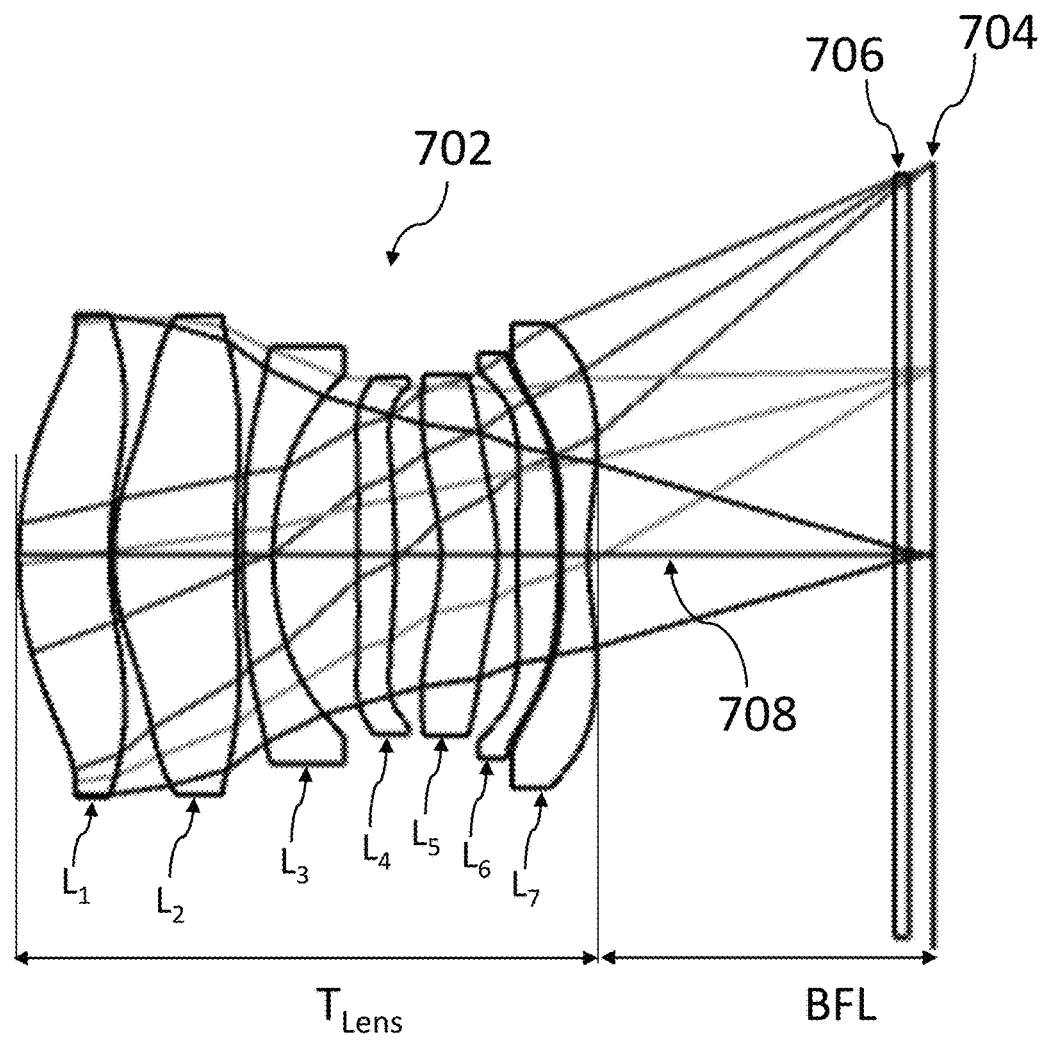
FIG. 7 shows yet another example of a pop-out optical lens system disclosed herein.

FIG. 7 shows an example of a pop-out optical lens system disclosed herein and numbered 700. Lens system 700 comprises a pop-out lens 702 having a lens optical axis 708, an image sensor 704 and, optionally, an optical element 706. Table 11 provides surface types and Table 12 provides aspheric coefficients.

Both L1 and L2 have relatively large thicknesses (>1 mm), low refractive indices (<1.55), a high Abbe number (>50) and a positive focal length. A ratio of T2 and the lens thickness fulfils $T2/T_{Lens}=0.21$. L6, L7 is an inverted doublet lens. This is valid not only for optical lens system 700, but also for optical lens system 800. S3 (rear surface of L1) of lens system 700 has a deflection point which is not located at the OA.

TABLE 11

Example 700
EFL = 12.64 mm, F number = 1.86, HFOV = 23.5 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | 0 | 3.400 | | | | |
| 2 | Lens 1 | QT1 | 5.134 | 1.306 | 3.501 | Plastic | 1.53 | 55.7 | 17.433 |
| 3 | | | 10.372 | 0.057 | 3.543 | | | | |
| 4 | Lens 2 | QT1 | 4.946 | 1.731 | 3.489 | Plastic | 1.53 | 55.7 | 10.7776 |
| 5 | | | 30.023 | 0.099 | 3.342 | | | | |
| 6 | Lens 3 | QT1 | 12.710 | 0.429 | 2.994 | Plastic | 1.66 | 20.4 | −9.467 |
| 7 | | | 4.160 | 1.218 | 2.557 | | | | |
| 8 | Lens 4 | QT1 | 29.157 | 0.526 | 2.539 | Plastic | 1.57 | 37.4 | 16.293 |
| 9 | | | −13.535 | 0.649 | 2.449 | | | | |
| 10 | Lens 5 | QT1 | −2.911 | 0.804 | 2.588 | Plastic | 1.67 | 19.2 | −41.963 |
| 11 | | | −3.605 | 0.279 | 2.655 | | | | |
| 12 | Lens 6 | QT1 | 12.820 | 0.594 | 2.679 | Plastic | 1.67 | 19.2 | 7.872 |
| 13 | | | −8.949 | 0.035 | 2.891 | | | | |
| 14 | Lens 7 | QT1 | −35.405 | 0.386 | 2.960 | Plastic | 1.59 | 28.4 | −6.046 |
| 15 | | | 3.992 | 4.366 | 3.277 | | | | |
| 16 | Filter | Plano | Infinity | 0.210 | — | Glass | 1.52 | 64.2 | |
| 17 | | | Infinity | 0.350 | — | | | | |
| 18 | Image | Plano | Infinity | — | — | | | | |

TABLE 12

Aspheric Coefficients

| Surface # | Norm Radius | A0 | A1 | A2 | A3 |
|---|---|---|---|---|---|
| 2 | 3.910 | −7.51E−01 | −8.68E−02 | 1.28E−01 | 5.87E−02 |
| 3 | 4.065 | −1.21E+00 | −1.05E−01 | 5.85E−02 | −7.60E−02 |
| 4 | 4.202 | −9.58E−01 | 7.18E−02 | −1.44E−02 | −1.65E−01 |
| 5 | 4.085 | −7.30E−01 | 5.67E−02 | 5.67E−03 | −6.59E−02 |
| 6 | 3.808 | 2.52E−01 | 8.47E−02 | 7.53E−02 | 1.45E−02 |
| 7 | 3.243 | 5.03E−01 | 1.46E−01 | 3.49E−02 | 2.68E−02 |
| 8 | 3.203 | 4.59E−01 | 2.53E−01 | −4.45E−02 | 6.72E−02 |
| 9 | 3.045 | 9.84E−01 | 5.49E−02 | −1.17E−01 | 5.96E−02 |
| 10 | 3.064 | 2.71E+00 | −5.59E−02 | −5.84E−03 | −8.20E−02 |
| 11 | 2.995 | 1.20E+00 | −1.53E−01 | −5.28E−03 | −6.31E−02 |
| 12 | 3.007 | −1.38E+00 | −6.03E−02 | −6.67E−03 | −4.18E−02 |
| 13 | 3.212 | −2.76E−01 | 2.69E−01 | 1.47E−01 | 1.22E−02 |
| 14 | 3.547 | −3.88E−01 | 8.79E−02 | 1.36E−01 | 7.68E−03 |
| 15 | 3.652 | −3.40E+00 | 2.94E−01 | −5.58E−02 | 7.99E−02 |

TABLE 12-continued

| Surface # | A4 | A5 | A6 | A7 | A8 |
|---|---|---|---|---|---|
| | Aspheric Coefficients (Continued) | | | | |
| 2 | −1.38E−02 | −5.73E−02 | −7.03E−02 | −6.74E−02 | −5.24E−02 |
| 3 | 6.89E−02 | 9.85E−03 | 4.42E−02 | 1.70E−03 | 2.22E−03 |
| 4 | 2.85E−02 | −3.62E−02 | 2.63E−02 | 5.16E−03 | 1.23E−02 |
| 5 | 8.33E−03 | 2.14E−02 | 4.59E−02 | 2.39E−02 | 9.39E−04 |
| 6 | −3.37E−03 | 1.36E−02 | 1.34E−03 | −1.04E−02 | −3.07E−03 |
| 7 | −1.05E−02 | 8.97E−03 | 1.80E−02 | 1.95E−02 | 1.52E−02 |
| 8 | 3.56E−02 | −3.14E−02 | −4.52E−02 | −1.98E−02 | −1.23E−03 |
| 9 | 1.13E−01 | 5.95E−02 | −2.55E−04 | −7.32E−03 | 5.41E−03 |
| 10 | −3.16E−02 | 2.42E−03 | −6.99E−04 | −1.32E−02 | −2.38E−02 |
| 11 | −6.21E−02 | −2.92E−02 | −3.48E−03 | 1.39E−02 | 1.65E−02 |
| 12 | −6.74E−02 | −3.69E−02 | −4.07E−02 | 1.11E−02 | 1.32E−02 |
| 13 | 3.39E−02 | 1.39E−02 | 2.39E−02 | −5.79E−04 | 2.37E−03 |
| 14 | −2.31E−02 | −5.33E−02 | −5.24E−03 | 1.07E−02 | 3.15E−02 |
| 15 | 4.42E−03 | 3.55E−03 | −9.16E−03 | −6.13E−03 | −3.67E−03 |

| Surface # | A9 | A10 | A11 | A12 | A13 |
|---|---|---|---|---|---|
| | Aspheric Coefficients (Continued) | | | | |
| 2 | −3.39E−02 | −1.77E−02 | −7.32E−03 | −2.23E−03 | −4.06E−04 |
| 3 | −1.26E−02 | −7.69E−03 | −7.43E−03 | −2.44E−03 | −1.19E−03 |
| 4 | −8.54E−03 | −8.01E−03 | −9.36E−03 | −3.32E−03 | −1.72E−03 |
| 5 | −1.83E−02 | −1.94E−02 | −1.39E−02 | −5.89E−03 | −1.85E−03 |
| 6 | 9.21E−03 | 1.49E−02 | 8.97E−03 | 3.28E−03 | 1.09E−04 |
| 7 | 1.56E−03 | 1.68E−02 | 1.26E−02 | 5.87E−03 | 1.33E−03 |
| 8 | 4.38E−03 | 3.37E−03 | 1.03E−03 | 3.37E−05 | −2.99E−05 |
| 9 | 1.17E−02 | 8.80E−03 | 3.23E−03 | 3.61E−04 | −1.17E−04 |
| 10 | −2.37E−02 | −1.67E−02 | −8.86E−03 | −3.24E−03 | −6.92E−04 |
| 11 | 1.18E−02 | 6.43E−03 | 2.22E−03 | 5.35E−04 | −1.74E−05 |
| 12 | 9.53E−03 | 7.83E−03 | 4.97E−03 | 2.57E−03 | 6.57E−04 |
| 13 | −6.38E−03 | 3.56E−03 | 2.98E−03 | 4.05E−03 | 8.41E−05 |
| 14 | 1.19E−02 | 2.13E−03 | −1.96E−03 | −1.73E−02 | −9.80E−03 |
| 15 | −1.56E−03 | −4.68E−04 | −2.40E−04 | −5.95E−05 | −1.16E−04 |

Figure 8:
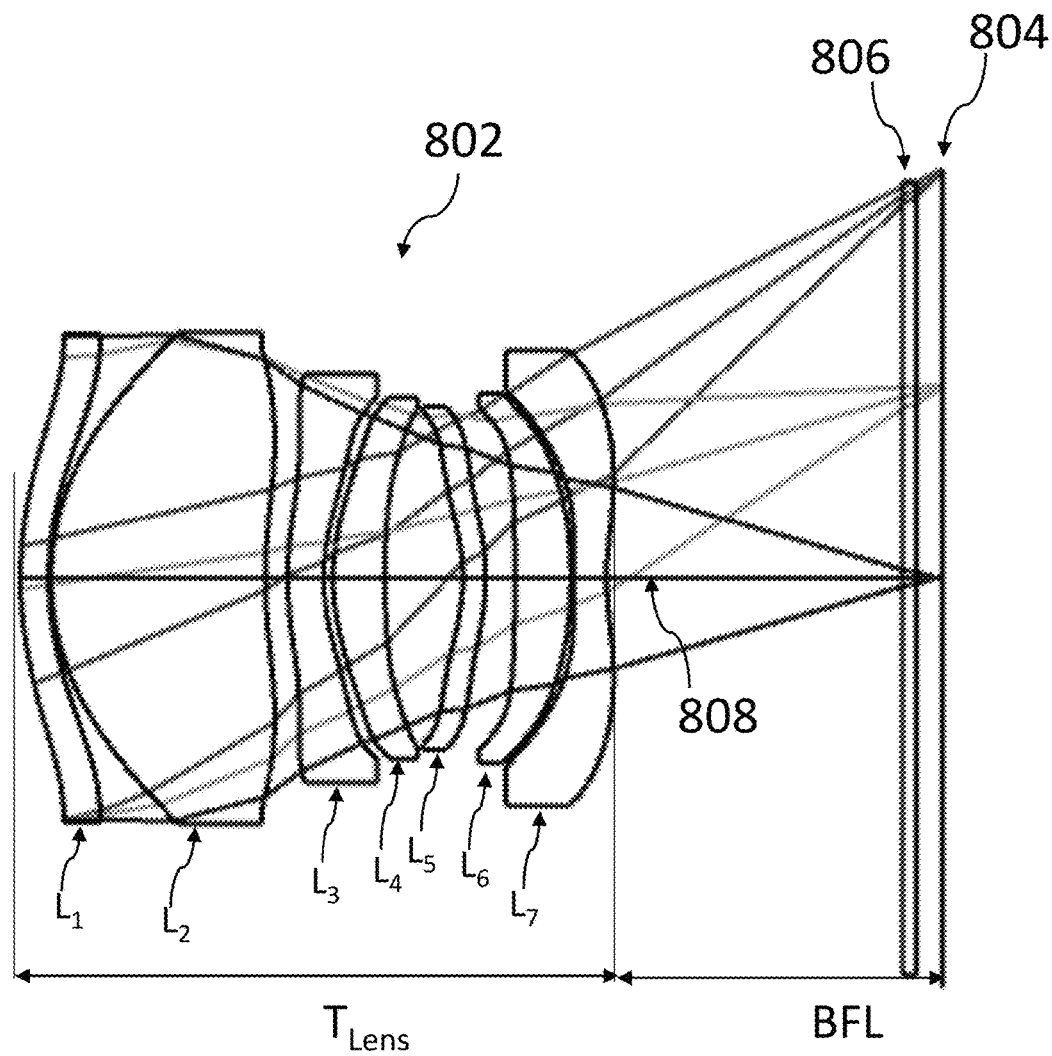
FIG. 8 shows yet another example of a pop-out optical lens system disclosed herein.

FIG. 8 shows an example of a pop-out optical lens system disclosed herein and numbered 800. Lens system 800 comprises a pop-out lens 802 having a lens optical axis 808, an image sensor 804 and, optionally, an optical element 706. Table 13 provides surface types and Table 14 provides aspheric coefficients.

L2 has a large thickness T2 that fulfills $T2/T_{Lens}>0.3$. S4, i.e. the rear surface of L2, has a deflection point which is not located at the OA. This is valid not only for optical lens system 800, but also for optical lens systems 900 and 1000. L6, L7 is an inverted doublet lens.

TABLE 13

Example 800
EFL = 12.36 mm, F number = 1.8, HFOV = 24.0 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. + Lens 1 | QT1 | 5.595 | 0.399 | 3.350 | Plastic | 1.67 | 19.2 | 202.728 |
| 2 | | | 5.665 | 0.036 | 3.390 | | | | |
| 3 | Lens 2 | QT1 | 4.272 | 2.966 | 3.550 | Plastic | 1.53 | 55.7 | 12.084 |
| 4 | | | 9.488 | 0.311 | 3.298 | | | | |
| 5 | Lens 3 | QT1 | 7.176 | 0.504 | 2.974 | Plastic | 1.66 | 20.4 | −11.244 |
| 6 | | | 3.563 | 0.131 | 2.506 | | | | |
| 7 | Lens 4 | QT1 | 3.430 | 0.714 | 2.477 | Plastic | 1.57 | 37.4 | 8.730 |
| 8 | | | 10.207 | 1.080 | 2.307 | | | | |
| 9 | Lens 5 | QT1 | −2.634 | 0.318 | 2.286 | Plastic | 1.66 | 20.4 | −33.880 |
| 10 | | | −3.125 | 0.401 | 2.399 | | | | |
| 11 | Lens 6 | QT1 | −55.421 | 0.774 | 2.464 | Plastic | 1.67 | 19.2 | 9.627 |
| 12 | | | −5.864 | 0.035 | 2.625 | | | | |
| 13 | Lens 7 | QT1 | 12.688 | 0.461 | 2.641 | Plastic | 1.59 | 28.4 | −8.022 |
| 14 | | | 3.406 | 4.105 | 3.116 | | | | |
| 15 | Filter | Plano | Infinity | 0.210 | — | Glass | 1.52 | 64.2 | |
| 16 | | | Infinity | 0.350 | — | | | | |
| 17 | Image | Plano | Infinity | — | — | | | | |

TABLE 14

| Surface # | Norm Radius | A0 | A1 | A2 | A3 |
|---|---|---|---|---|---|
| | Aspheric Coefficients | | | | |
| 1 | 3.910 | −9.45E−01 | −7.03E−02 | 6.97E−02 | 2.73E−02 |
| 2 | 4.065 | −8.71E−01 | −1.39E−01 | 2.01E−01 | 3.27E−02 |
| 3 | 4.202 | 2.66E−02 | −1.62E−01 | 2.05E−01 | −7.35E−04 |
| 4 | 4.085 | −1.08E+00 | 3.18E−01 | 3.98E−02 | −6.54E−02 |
| 5 | 3.808 | −1.51E−01 | 5.60E−01 | 1.62E−03 | −9.00E−02 |
| 6 | 3.243 | −3.65E−01 | 3.04E−01 | −8.56E−02 | −1.27E−01 |
| 7 | 3.203 | −2.56E−01 | 4.14E−01 | 4.90E−02 | −7.30E−02 |
| 8 | 3.045 | 2.99E−01 | −1.69E−01 | −9.76E−02 | −2.49E−05 |
| 9 | 3.064 | 2.05E+00 | −3.63E−01 | −6.87E−02 | −2.54E−01 |
| 10 | 2.995 | 1.19E+00 | −3.16E−01 | −4.39E−02 | −1.82E−01 |
| 11 | 3.007 | −1.43E+00 | −3.24E−01 | −1.46E−01 | −1.74E−01 |
| 12 | 3.212 | −6.02E−01 | 1.91E−01 | 8.77E−02 | −5.42E−03 |
| 13 | 3.547 | −2.25E+00 | 1.02E+00 | −1.55E−01 | −8.71E−02 |
| 14 | 3.652 | −5.08E+00 | −1.37E−01 | −4.88E−01 | −1.22E−01 |

| Surface # | A4 | A5 | A6 | A7 | A8 |
|---|---|---|---|---|---|
| | Aspheric Coefficients (Continued) | | | | |
| 1 | 2.46E−02 | 1.77E−02 | 1.50E−02 | 9.21E−03 | 7.19E−03 |
| 2 | 8.22E−02 | 3.93E−02 | 3.96E−02 | 9.96E−03 | 5.69E−03 |
| 3 | −2.03E−02 | −6.62E−02 | −8.69E−03 | 4.17E−03 | 1.22E−02 |
| 4 | 3.08E−02 | 6.28E−02 | 8.95E−02 | 2.39E−02 | −3.30E−02 |
| 5 | 1.53E−02 | −2.80E−02 | 2.82E−02 | 7.69E−03 | 6.63E−03 |
| 6 | −3.46E−02 | −6.42E−02 | 9.10E−02 | 5.04E−02 | 6.80E−02 |
| 7 | −5.52E−02 | −9.05E−02 | −8.81E−02 | −5.21E−02 | −1.67E−03 |
| 8 | 3.83E−02 | 3.55E−02 | −7.62E−03 | −1.68E−02 | −2.53E−03 |
| 9 | −2.47E−01 | −1.03E−01 | −1.14E−02 | 4.35E−03 | −2.53E−02 |
| 10 | −1.69E−01 | −5.27E−02 | 1.03E−02 | 1.99E−02 | 1.17E−03 |
| 11 | −1.14E−01 | −3.38E−02 | −6.77E−03 | −1.11E−02 | −7.37E−03 |

TABLE 14-continued

| | | | | | |
|---|---|---|---|---|---|
| 12 | −1.33E−02 | 1.16E−02 | 1.18E−02 | −1.07E−03 | −5.62E−03 |
| 13 | −1.29E−01 | −1.02E−02 | 1.32E−02 | 1.11E−02 | 1.10E−02 |
| 14 | −1.59E−01 | −8.96E−02 | −7.05E−02 | −3.30E−02 | −1.31E−02 |

Aspheric Coefficients (Continued)

| Surface # | A9 | A10 | A11 | A12 | |
|---|---|---|---|---|---|
| 1 | 3.06E−03 | 2.28E−03 | 8.12E−04 | 3.31E−04 | 1.41E−04 |
| 2 | −7.95E−03 | −3.19E−03 | −5.73E−03 | −1.25E−03 | −1.05E−03 |
| 3 | −8.86E−03 | −1.18E−02 | −1.52E−02 | −6.34E−03 | −2.99E−03 |
| 4 | −6.94E−02 | −6.22E−02 | −3.94E−02 | −1.60E−02 | −4.57E−03 |
| 5 | −1.42E−02 | −1.95E−02 | −2.09E−02 | −1.16E−02 | −5.12E−03 |
| 6 | 3.24E−02 | 1.08E−02 | −7.72E−04 | 1.32E−03 | 3.14E−04 |
| 7 | 1.02E−02 | 1.66E−02 | 1.15E−02 | 6.82E−03 | 1.96E−03 |
| 8 | 3.93E−03 | 3.93E−03 | 1.43E−03 | −1.40E−04 | −8.49E−05 |
| 9 | −4.69E−02 | −4.09E−02 | −2.21E−02 | −7.12E−03 | −1.03E−03 |
| 10 | −1.51E−02 | −1.58E−02 | −9.22E−03 | −3.08E−03 | −4.34E−04 |
| 11 | 2.27E−03 | 8.49E−03 | 6.88E−03 | 2.90E−03 | 5.66E−04 |
| 12 | −5.23E−03 | 2.52E−03 | 4.17E−03 | 2.44E−03 | 4.00E−04 |
| 13 | 2.58E−02 | 2.81E−02 | 1.01E−02 | −3.00E−04 | −1.51E−03 |
| 14 | 5.88E−04 | 3.87E−03 | 3.11E−03 | 1.33E−03 | 3.09E−04 |

Figure 9:
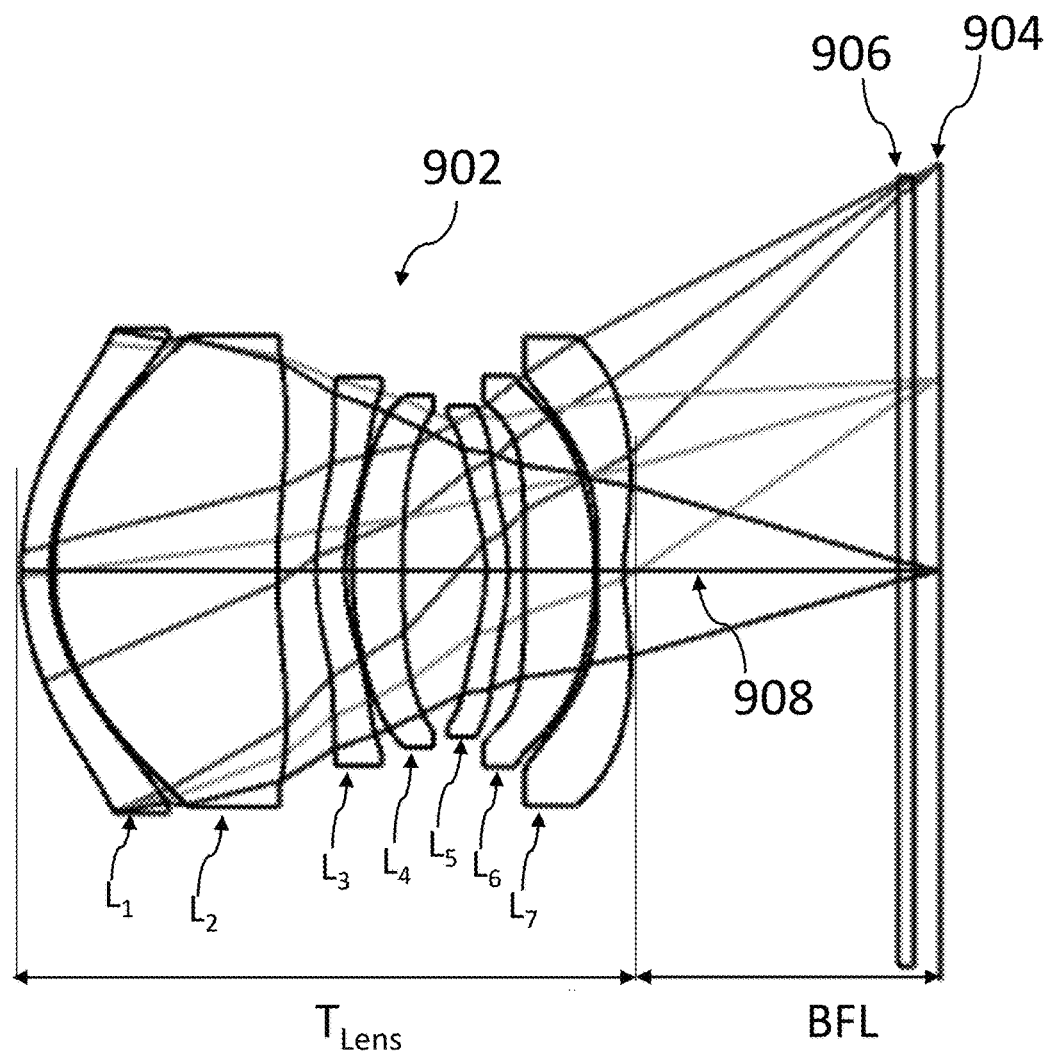
FIG. 9 shows yet another example of a pop-out optical lens system disclosed herein.

FIG. 9 shows an example of a pop-out optical lens system disclosed herein and numbered 900. Lens system 900 comprises a pop-out lens 902 having a lens optical axis 908, an image sensor 904 and, optionally, an optical element 906. Table 15 provides surface types and Table 16 provides aspheric coefficients.

Lens element pairs L1, L2 and L3, L4 and L6, L7 are inverted doublet lenses.

TABLE 15

Example 900
EFL = 12 mm, F number = 1.8, HFOV = 24.6 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. + Lens 1 | QT1 | 3.906 | 0.394 | 3.300 | Plastic | 1.64 | 23.5 | 1356.725 |
| 2 | | | 3.768 | 0.058 | 3.226 | | | | |
| 3 | Lens 2 | QT1 | 4.188 | 3.007 | 3.301 | Plastic | 1.53 | 55.7 | 12.289 |
| 4 | | | 8.601 | 0.525 | 3.108 | | | | |
| 5 | Lens 3 | QT1 | 3.979 | 0.390 | 2.693 | Plastic | 1.66 | 20.4 | −42.268 |
| 6 | | | 3.350 | 0.102 | 2.481 | | | | |
| 7 | Lens 4 | QT1 | 5.581 | 0.677 | 2.378 | Plastic | 1.53 | 55.7 | 16.257 |
| 8 | | | 14.850 | 1.118 | 2.198 | | | | |
| 9 | Lens 5 | QT1 | −2.549 | 0.299 | 2.196 | Plastic | 1.66 | 20.4 | −24.044 |
| 10 | | | −3.173 | 0.222 | 2.343 | | | | |
| 11 | Lens 6 | QT1 | 1,175.633 | 0.944 | 2.382 | Plastic | 1.67 | 19.2 | 9.670 |
| 12 | | | −6.580 | 0.032 | 2.669 | | | | |
| 13 | Lens 7 | QT1 | 10.727 | 0.375 | 2.782 | Plastic | 1.59 | 28.4 | −8.445 |
| 14 | | | 3.363 | 3.705 | 3.197 | | | | |
| 15 | Filter | Plano | Infinity | 0.210 | — | Glass | 1.52 | 64.2 | |
| 16 | | | Infinity | 0.350 | — | | | | |
| 17 | Image | Plano | Infinity | — | — | | | | |

TABLE 16

Aspheric Coefficients

| Surface # | Norm Radius | A0 | A1 | A2 | A3 |
|---|---|---|---|---|---|
| 1 | 3.910 | −1.32E+00 | −2.83E−01 | 4.31E−02 | 5.01E−02 |
| 2 | 4.065 | −1.12E+00 | −4.74E−01 | 3.16E−01 | 7.44E−02 |
| 3 | 4.202 | 4.30E−01 | −2.29E−01 | 2.88E−02 | −4.32E−02 |
| 4 | 4.085 | −1.21E+00 | 3.83E−01 | 1.04E−01 | 1.97E−02 |
| 5 | 3.808 | −1.40E+00 | 7.36E−01 | −1.34E−01 | −1.58E−02 |
| 6 | 3.243 | −1.23E+00 | 3.74E−01 | 2.66E−02 | −1.15E−01 |
| 7 | 3.203 | 6.10E−01 | 1.24E−01 | −6.11E−03 | −1.74E−02 |
| 8 | 3.045 | 5.85E−01 | −2.88E−01 | −1.72E−01 | 1.89E−02 |
| 9 | 3.064 | 1.98E+00 | −2.90E−01 | 3.96E−03 | −2.43E−01 |
| 10 | 2.995 | 1.65E+00 | −1.22E−01 | −4.30E−02 | −2.06E−01 |
| 11 | 3.007 | −1.57E+00 | −2.15E−01 | −1.62E−01 | −1.96E−01 |
| 12 | 3.212 | −3.63E−01 | 6.00E−01 | 1.74E−01 | −1.32E−02 |
| 13 | 3.547 | −2.04E+00 | 1.12E+00 | −2.79E−01 | −4.23E−02 |
| 14 | 3.652 | −5.35E+00 | −1.07E−01 | −4.43E−01 | −2.94E−02 |

Aspheric Coefficients (Continued)

| Surface # | A4 | A5 | A6 | A7 | A8 |
|---|---|---|---|---|---|
| 1 | 4.98E−02 | 1.88E−02 | 8.37E−03 | −6.79E−03 | −7.52E−03 |
| 2 | 8.18E−02 | −3.29E−03 | 2.95E−02 | 6.27E−03 | 1.31E−02 |
| 3 | −3.97E−02 | −6.45E−02 | 5.18E−02 | 6.38E−02 | 4.38E−02 |
| 4 | 1.43E−02 | 4.06E−02 | 5.89E−02 | 2.11E−02 | −2.08E−02 |
| 5 | −1.84E−02 | 2.17E−02 | 3.55E−02 | −2.54E−02 | −3.16E−02 |
| 6 | −9.25E−02 | −8.42E−02 | 2.72E−02 | 7.09E−02 | 6.76E−02 |
| 7 | −3.51E−02 | −9.48E−02 | −7.75E−02 | −2.98E−02 | 1.24E−02 |
| 8 | 6.25E−02 | 2.63E−02 | −2.99E−02 | −2.84E−02 | 1.09E−03 |
| 9 | −2.39E−01 | −1.12E−01 | −1.69E−02 | 1.29E−02 | −1.32E−02 |
| 10 | −1.21E−01 | 2.95E−03 | 1.76E−02 | −7.06E−03 | −1.82E−02 |
| 11 | −1.07E−01 | −1.70E−02 | −1.05E−02 | −2.73E−02 | −1.50E−02 |
| 12 | −6.35E−02 | −1.40E−02 | 2.54E−02 | 2.78E−02 | 1.21E−02 |
| 13 | −6.51E−02 | 4.18E−02 | −8.67E−03 | −1.98E−02 | −6.10E−03 |
| 14 | −1.11E−01 | −6.91E−02 | −8.80E−02 | −6.37E−02 | −4.68E−02 |

Aspheric Coefficients (Continued)

| Surface # | A9 | A10 | A11 | A12 |
|---|---|---|---|---|
| 1 | −8.87E−03 | −4.60E−03 | −2.84E−03 | −7.21E−04 | −2.65E−04 |
| 2 | −1.33E−02 | −1.26E−02 | −1.73E−02 | −7.58E−03 | −3.53E−03 |
| 3 | −2.64E−02 | −4.65E−02 | −4.59E−02 | −2.06E−02 | −6.68E−03 |
| 4 | −4.00E−02 | −3.31E−02 | −1.75E−02 | −5.74E−03 | −1.12E−03 |

TABLE 16-continued

| | | | | | |
|---|---|---|---|---|---|
| 5 | −1.06E−02 | 1.04E−02 | 1.09E−02 | 3.54E−03 | −9.11E−04 |
| 6 | 2.72E−02 | 5.53E−03 | −6.27E−04 | 1.59E−03 | 6.79E−04 |
| 7 | 7.94E−03 | 2.09E−03 | 3.89E−04 | 2.11E−03 | 1.09E−03 |
| 8 | 1.08E−02 | 5.81E−03 | 3.94E−04 | −8.64E−04 | −3.17E−04 |
| 9 | −4.80E−02 | −5.38E−02 | −3.41E−02 | −1.25E−02 | −2.13E−03 |
| 10 | −1.24E−02 | −3.58E−03 | −5.27E−05 | 3.78E−04 | 1.13E−04 |
| 11 | 8.28E−03 | 1.73E−02 | 1.14E−02 | 3.80E−03 | 5.25E−04 |
| 12 | 4.29E−03 | 3.80E−03 | 3.42E−03 | 1.25E−03 | 2.07E−04 |
| 13 | 3.33E−02 | 3.69E−02 | 1.73E−02 | 3.06E−03 | 2.40E−04 |
| 14 | −2.37E−02 | −1.03E−02 | −2.63E−03 | −3.62E−04 | 9.37E−05 |

Figure 10:
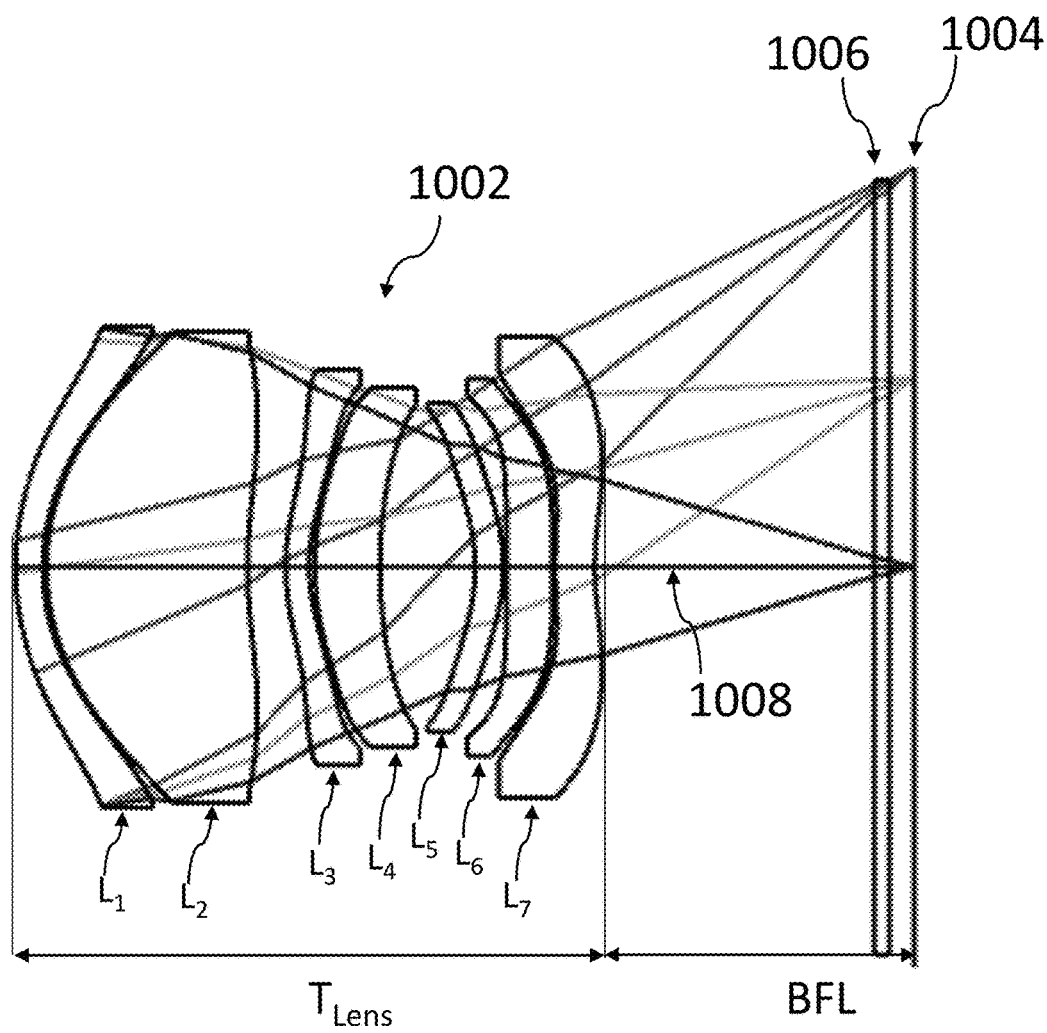
FIG. 10 shows yet another example of a pop-out optical lens system disclosed herein.

FIG. 10 shows an example of a pop-out optical lens system disclosed herein and numbered 1000. Lens system 1000 comprises a pop-out lens 1002 having a lens optical axis 1008, an image sensor 1004 and, optionally, an optical element 1006. Table 17 provides surface types and Table 18 provides aspheric coefficients.

Lens element pairs L1, L2 and L3, LA and L6, L7 are inverted doublet lenses.

TABLE 17

Example 1000
EFL = 12.14 mm, F number = 1.8, HFOV = 24.4 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. + Lens 1 | QT1 | 4.065 | 0.394 | 3.350 | Plastic | 1.67 | 19.2 | −254.547 |
| 2 | | | 3.816 | 0.055 | 3.297 | | | | |
| 3 | Lens 2 | QT1 | 4.097 | 2.814 | 3.390 | Plastic | 1.53 | 55.7 | 14.031 |
| 4 | | | 6.833 | 0.534 | 3.200 | | | | |
| 5 | Lens 3 | QT1 | 3.443 | 0.328 | 2.788 | Plastic | 1.61 | 25.6 | −26.878 |
| 6 | | | 2.749 | 0.083 | 2.517 | | | | |
| 7 | Lens 4 | QT1 | 3.557 | 0.920 | 2.491 | Plastic | 1.53 | 55.7 | 12.593 |
| 8 | | | 6.834 | 1.333 | 2.261 | | | | |
| 9 | Lens 5 | QT1 | −2.696 | 0.393 | 2.277 | Plastic | 1.66 | 20.4 | −77.415 |
| 10 | | | −3.011 | 0.037 | 2.416 | | | | |
| 11 | Lens 6 | QT1 | 22.703 | 0.655 | 2.478 | Plastic | 1.57 | 37.4 | 34.384 |
| 12 | | | −141.675 | 0.036 | 2.675 | | | | |
| 13 | Lens 7 | QT1 | 5.752 | 0.553 | 2.740 | Plastic | 1.54 | 55.9 | −21.200 |
| 14 | | | 3.712 | 3.927 | 3.204 | | | | |
| 15 | Filter | Plano | Infinity | 0.210 | — | Glass | 1.52 | 64.2 | |
| 16 | | | Infinity | 0.350 | — | | | | |
| 17 | Image | Plano | Infinity | — | — | | | | |

TABLE 18

Aspheric Coefficients

| Surface # | Norm Radius | A0 | A1 | A2 | A3 |
|---|---|---|---|---|---|
| 1 | 3.910 | −1.19E+00 | −2.90E−01 | 8.85E−03 | 1.01E−02 |
| 2 | 4.065 | −1.18E+00 | −4.06E−01 | 2.84E−01 | 8.18E−02 |
| 3 | 4.202 | 2.35E−01 | −8.02E−02 | 2.39E−01 | −6.97E−02 |
| 4 | 4.085 | −1.37E+00 | 4.88E−01 | 3.39E−02 | −3.49E−02 |
| 5 | 3.808 | −1.45E+00 | 1.05E+00 | −3.83E−03 | −7.43E−02 |
| 6 | 3.243 | −2.29E+00 | 2.39E−01 | −4.37E−02 | −7.65E−02 |
| 7 | 3.203 | −1.86E−01 | 3.50E−01 | −4.34E−02 | −1.00E−01 |
| 8 | 3.045 | 2.18E−01 | −2.04E−01 | −1.94E−01 | −3.09E−02 |
| 9 | 3.064 | 1.53E+00 | −1.60E−01 | −2.98E−02 | −1.80E−01 |
| 10 | 2.995 | 9.13E−01 | −1.91E−01 | −1.52E−01 | −1.52E−01 |
| 11 | 3.007 | −1.83E+00 | −2.68E−01 | −2.01E−01 | −1.68E−01 |
| 12 | 3.212 | −1.03E+00 | 7.17E−01 | 2.22E−01 | 6.33E−02 |
| 13 | 3.547 | −2.74E+00 | 1.00E+00 | −2.27E−01 | 1.71E−02 |
| 14 | 3.652 | −4.06E+00 | 1.71E−01 | −2.58E−01 | −3.57E−02 |

Aspheric Coefficients (Continued)

| Surface # | A4 | A5 | A6 | A7 | A8 |
|---|---|---|---|---|---|
| 1 | 1.79E−02 | 7.80E−03 | 9.52E−03 | 4.10E−03 | 4.25E−03 |
| 2 | 7.48E−02 | 7.90E−03 | 2.74E−02 | 1.14E−02 | 1.68E−02 |
| 3 | −5.99E−02 | −4.79E−02 | 5.17E−02 | 5.65E−02 | 3.25E−02 |
| 4 | −2.73E−02 | 1.34E−02 | 3.87E−02 | 1.36E−02 | −1.86E−02 |
| 5 | 1.06E−02 | 4.07E−02 | 3.20E−02 | −2.00E−02 | −2.65E−02 |
| 6 | −7.44E−02 | −6.59E−02 | 9.77E−03 | 5.79E−02 | 6.65E−02 |
| 7 | −8.13E−02 | −8.26E−02 | −6.46E−02 | −3.22E−02 | −4.88E−03 |
| 8 | 5.93E−02 | 3.60E−02 | −2.39E−02 | −3.73E−02 | −1.22E−02 |
| 9 | −1.99E−01 | −1.01E−01 | −1.81E−02 | 1.11E−02 | −5.00E−03 |
| 10 | −1.17E−01 | −1.13E−02 | 1.88E−02 | 9.94E−03 | −1.58E−02 |
| 11 | −1.08E−01 | −2.46E−02 | −9.43E−03 | −1.46E−02 | −1.81E−02 |
| 12 | 2.39E−03 | −5.99E−03 | 1.56E−03 | 1.57E−02 | 2.04E−02 |
| 13 | −5.63E−03 | 2.42E−02 | −1.63E−03 | −1.77E−02 | −1.50E−02 |
| 14 | −1.05E−01 | −7.61E−02 | −7.03E−02 | −4.64E−02 | −2.87E−02 |

Aspheric Coefficients (Continued)

| Surface # | A9 | A10 | A11 | A12 |
|---|---|---|---|---|
| 1 | 1.60E−03 | 1.60E−03 | 6.03E−04 | 4.06E−04 | 7.47E−05 |
| 2 | −1.99E−03 | −2.89E−03 | −7.55E−03 | −3.91E−03 | −1.79E−03 |
| 3 | −2.23E−02 | −3.48E−02 | −3.17E−02 | −1.43E−02 | −4.06E−03 |
| 4 | −3.32E−02 | −2.74E−02 | −1.49E−02 | −5.09E−03 | −1.01E−03 |
| 5 | −1.35E−02 | −1.35E−03 | 2.58E−04 | −1.93E−04 | −1.01E−03 |
| 6 | 3.88E−02 | 1.73E−02 | 5.30E−03 | 3.36E−03 | 1.42E−03 |
| 7 | −1.06E−03 | 5.37E−04 | 7.91E−04 | 2.23E−03 | 1.48E−03 |
| 8 | 1.07E−02 | 1.52E−02 | 9.18E−03 | 3.13E−03 | 5.78E−04 |
| 9 | −2.80E−02 | −3.49E−02 | −2.43E−02 | −1.02E−02 | −2.05E−03 |
| 10 | −2.18E−02 | −1.77E−02 | −7.95E−03 | −2.68E−03 | −1.41E−04 |
| 11 | −4.37E−03 | 3.79E−03 | 6.49E−03 | 2.92E−03 | 9.86E−04 |
| 12 | 2.15E−02 | 1.58E−02 | 1.01E−02 | 2.91E−03 | 8.28E−04 |
| 13 | 1.68E−02 | 3.20E−02 | 2.56E−02 | 1.09E−02 | 3.86E−03 |
| 14 | −1.37E−02 | −5.44E−03 | −1.22E−03 | −2.39E−05 | 2.20E−04 |

Figure 11:
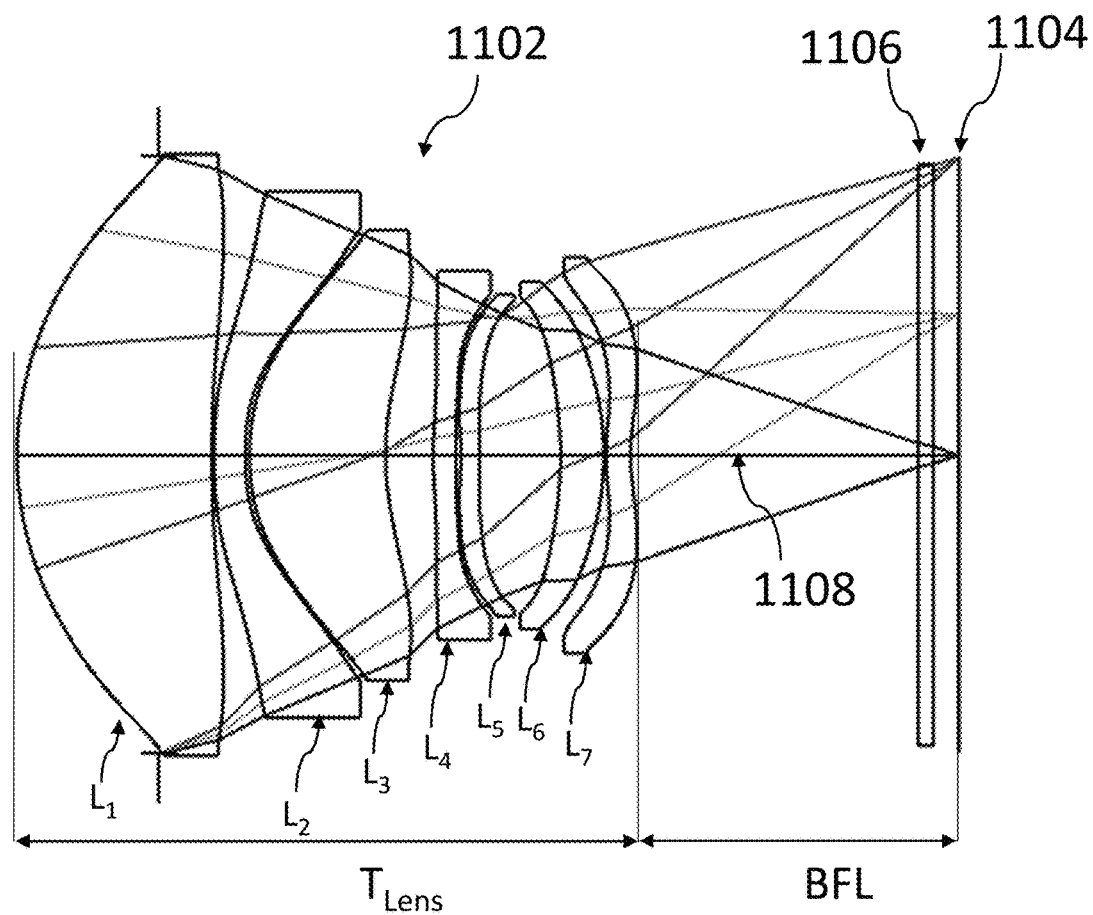
FIG. 11 shows yet another example of a pop-out optical lens system disclosed herein.

FIG. 11 shows an example of a pop-out optical lens system disclosed herein and numbered 1100. Lens system 1100 comprises a pop-out lens 1102 having a lens optical axis 1108, an image sensor 1104 and, optionally, an optical element 1106. Table 19 provides surface types and Table 20 provides aspheric coefficients.

Lens element pair L2, L3 is an inverted doublet lens. Lens element pair LA, L5 is a doublet lens.

TABLE 19

Example 1100
EFL = 12.9 mm, F number = 1.6, HFOV = 16.97 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −1.901 | 4.000 | | | | |
| 2 | Lens 1 | QT1 | 4.397 | 2.611 | 4.000 | Plastic | 1.53 | 55.7 | 10.166 |
| 3 | | | 17.965 | 0.031 | 3.823 | | | | |
| 4 | Lens 2 | QT1 | 8.898 | 0.414 | 3.495 | Plastic | 1.61 | 25.6 | −14.827 |
| 5 | | | 4.436 | 0.059 | 3.008 | | | | |
| 6 | Lens 3 | QT1 | 3.667 | 1.823 | 2.986 | Plastic | 1.53 | 55.7 | 41.032 |
| 7 | | | 3.636 | 0.638 | 2.764 | | | | |
| 8 | Lens 4 | QT1 | 5.827 | 0.306 | 2.438 | Plastic | 1.61 | 25.6 | 12.497 |
| 9 | | | 23.196 | 0.064 | 2.132 | | | | |
| 10 | Lens 5 | QT1 | −5.240 | 0.248 | 2.123 | Plastic | 1.67 | 19.2 | −12.040 |
| 11 | | | −14.953 | 1.083 | 2.050 | | | | |
| 12 | Lens 6 | QT1 | −4.568 | 0.575 | 2.096 | Plastic | 1.67 | 19.2 | −2656.172 |
| 13 | | | −4.813 | 0.031 | 2.290 | | | | |
| 14 | Lens 7 | QT1 | 2.853 | 0.330 | 2.500 | Plastic | 1.57 | 37.4 | −447.224 |
| 15 | | | 2.703 | 3.849 | 2.618 | | | | |
| 16 | Filter | Plano | Infinity | 0.210 | — | Glass | 1.52 | 64.2 | |
| 17 | | | Infinity | 0.350 | — | | | | |
| 18 | Image | Plano | Infinity | — | — | | | | |

TABLE 20

Aspheric Coefficients

| Surface # | Norm Radius | A0 | A1 | A2 | A3 |
|---|---|---|---|---|---|
| 2 | 4.818 | −3.62E+00 | −2.23E+00 | −1.23E+00 | −5.54E−01 |
| 3 | 5.297 | 2.02E−01 | 3.93E−01 | −5.30E−01 | −8.89E−01 |
| 4 | 5.072 | −4.30E−01 | −2.01E−01 | 6.07E−02 | −1.69E−01 |
| 5 | 3.138 | 6.05E−01 | −4.09E−01 | 1.48E−01 | −4.44E−02 |
| 6 | 6.262 | −1.02E+02 | −3.90E+01 | −8.51E+00 | −4.43E+00 |
| 7 | 3.511 | −1.51E+00 | 8.76E−01 | 4.75E−01 | 1.20E−01 |
| 8 | 4.512 | 4.77E+00 | 7.82E−01 | −2.86E+00 | −1.32E+00 |
| 9 | 1.949 | 1.90E−01 | 3.57E−02 | −8.42E−03 | −4.44E−03 |
| 10 | 2.231 | 1.12E+00 | −1.75E−01 | −1.61E−01 | −7.72E−02 |
| 11 | 2.558 | −9.62E−02 | −1.07E+00 | −3.44E−01 | 1.07E−01 |
| 12 | 4.703 | 1.97E+01 | 2.07E+01 | 3.93E+00 | −3.35E+00 |
| 13 | 2.786 | 1.11E+00 | 1.34E+00 | 7.30E−01 | 4.16E−02 |
| 14 | 3.511 | −1.33E+01 | −1.50E+00 | 2.48E+00 | 5.41E−01 |
| 15 | 3.203 | −4.82E+00 | 1.17E+00 | 7.73E−01 | 5.93E−01 |

Aspheric Coefficients (Continued)

| Surface # | A4 | A5 | A6 | A7 | A8 |
|---|---|---|---|---|---|
| 2 | −1.69E−01 | 3.84E−02 | 1.27E−01 | 1.41E−01 | 1.11E−01 |
| 3 | −4.10E−01 | 2.78E−01 | 7.43E−01 | 7.77E−01 | 5.50E−01 |
| 4 | −2.74E−02 | −2.24E−01 | −2.25E−01 | −2.05E−01 | −1.24E−01 |
| 5 | 2.43E−02 | −7.74E−03 | −8.19E−04 | −2.05E−04 | 5.64E−05 |
| 6 | −1.74E+00 | 1.44E+00 | 1.53E+00 | −6.65E−01 | −1.22E+00 |
| 7 | −2.00E−01 | −3.41E−01 | −3.41E−01 | −2.57E−01 | −1.58E−01 |
| 8 | 1.29E−01 | 5.27E−01 | 3.50E−01 | 5.68E−01 | 7.95E−01 |
| 9 | 2.10E−03 | 2.17E−03 | −3.28E−03 | 3.07E−03 | −2.06E−03 |
| 10 | −3.67E−02 | −4.22E−02 | −2.91E−02 | −1.72E−02 | −1.47E−02 |
| 11 | 2.63E−01 | 3.64E−02 | −2.41E−01 | −3.94E−01 | −3.69E−01 |
| 12 | 3.22E+00 | 8.55E+00 | 6.90E+00 | 2.40E+00 | 2.25E−02 |
| 13 | −4.93E−01 | −6.63E−01 | −6.13E−01 | −4.40E−01 | −2.62E−01 |
| 14 | 4.53E+00 | 2.51E+00 | 9.89E−01 | 6.29E−01 | 6.26E−01 |
| 15 | −2.96E−02 | −3.26E−01 | −4.11E−01 | −3.13E−01 | −1.85E−01 |

Aspheric Coefficients (Continued)

| Surface # | A9 | A10 | A11 | A12 | A13 |
|---|---|---|---|---|---|
| 2 | 6.80E−02 | 3.28E−02 | 1.22E−02 | 3.26E−03 | 5.37E−04 |
| 3 | 2.84E−01 | 1.02E−01 | 2.50E−02 | 2.67E−03 | 1.49E−04 |
| 4 | −7.59E−02 | −4.25E−02 | −1.59E−02 | −3.39E−03 | −5.16E−04 |
| 5 | 6.88E−05 | −4.01E−05 | 4.38E−05 | 2.44E−05 | 2.43E−05 |
| 6 | −5.02E−01 | −6.67E−02 | −1.14E−01 | −7.83E−02 | −1.39E−02 |
| 7 | −7.71E−02 | −3.06E−02 | −9.28E−03 | −2.14E−03 | −2.85E−04 |
| 8 | 6.62E−01 | 2.87E−01 | 3.88E−02 | −1.10E−02 | −3.33E−03 |
| 9 | 1.13E−03 | −4.81E−04 | 1.18E−04 | −8.17E−06 | −1.29E−06 |
| 10 | −4.56E−03 | −5.04E−03 | −1.00E−03 | −1.14E−03 | −1.70E−04 |
| 11 | −2.45E−01 | −1.18E−01 | −3.76E−02 | −6.60E−03 | 3.35E−04 |
| 12 | 3.08E−01 | 8.96E−01 | 6.09E−01 | 1.46E−01 | −1.71E−03 |
| 13 | −1.28E−01 | −4.93E−02 | −1.35E−02 | −2.19E−03 | 5.59E−05 |
| 14 | 5.00E−01 | 2.51E−01 | 7.63E−02 | 1.10E−02 | −2.76E−04 |
| 15 | −8.59E−02 | −3.29E−02 | −1.11E−02 | −2.89E−03 | −6.95E−04 |

While this disclosure has been described in terms of certain examples and generally associated methods, alterations and permutations of the examples and methods will be apparent to those skilled in the art. The disclosure is to be understood as not limited by the specific examples described herein, but only by the scope of the appended claims.

It is appreciated that certain features of the presently disclosed subject matter, which are, for clarity, described in the context of separate examples, may also be provided in combination in a single example. Conversely, various features of the presently disclosed subject matter, which are, for brevity, described in the context of a single example, may also be provided separately or in any suitable sub-combination.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

What is claimed is:

1. A lens system for a compact digital camera, the lens system having a pop-out state and a collapsed state and comprising:

an image sensor having a sensor diagonal SD; and a lens with N≥6 lens elements L1-LN arranged along a lens optical axis (OA) starting with L1 from an object side towards an image side, each lens element Li having a respective clear aperture diameter $DA_{Li}$ wherein 1≤i≤N, and having in the pop-out state a field of view FOV<55 deg, a f number (f/#), a lens thickness $T_{Lens}$, a back focal length BFL, an effective focal length EFL, and a total track length TTL<20 mm, wherein the lens has in the collapsed state a collapsed total track length c-TTL, wherein EFL≥10 mm, wherein f/#<2, and wherein a ratio c-TTL/EFL<0.8.

2. The lens system of claim 1, wherein the lens system is configured to switch from the pop-out state to the collapsed state and vice versa by collapsing BFL to a collapsed BFL (c-BFL).

3. The lens system of claim 2, wherein 0.04≤c-BFL/BFL<0.9.

4. The lens system of claim 1, wherein c-TTL/EFL<0.75.

5. The lens system of claim 1, wherein c-TTL/EFL<0.7.

6. The lens system of claim 1, wherein c-TTL≤$T_{Lens}$+1 mm.

7. The lens system of claim 1, wherein c-TTL≤$T_{Lens}$+0.9 mm.

8. The lens system of claim 1, wherein c-TTL≤$T_{Lens}$+0.8 mm.

9. The lens system of claim 1, wherein c-TTL≤$T_{Lens}$+0.7 mm.

10. The lens system of claim 1, wherein 0.9×EFL<TTL<1.1×EFL.

11. The lens system of claim 1, wherein 8 mm<SD<15 mm.

12. The lens system of claim 1, wherein EFL≥12 mm.

13. The lens system of claim 1, wherein EFL≤20 mm.

14. The lens system of claim 1, wherein TTL<15 mm.

15. The lens system of claim 1, wherein f/#<1.9.

16. The lens system of claim 1, wherein f/#<1.8.

17. The lens system of claim 1, wherein f/#<1.7.

18. The lens system of claim 1, wherein $T_{Lens}$/TTL<0.75.

19. The lens system of claim 1, wherein $T_{Lens}$/TTL<0.7.

20. The lens system of claim 1, wherein BFL>0.3×TTL.

21. The lens system of claim 1, wherein L1 is made of glass and has an Abbe number larger than 50.

22. The lens system of claim 1, wherein the lens system is integrated in a camera module, and wherein the camera module is integrated in a smartphone.

* * * * *